US012709149B2

(12) United States Patent
Bonny et al.

(10) Patent No.: US 12,709,149 B2
(45) Date of Patent: Aug. 18, 2026

(54) PARALLEL HYBRID SYSTEM WITH ELECTRIC MOTOR FOR VEHICLE

(71) Applicant: Hydro-Gear Limited Partnership, Sullivan, IL (US)

(72) Inventors: Nathan W. Bonny, Shelbyville, IL (US); Scott W. Keller, Charleston, IL (US); Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 18/979,314

(22) Filed: Dec. 12, 2024

(65) Prior Publication Data

US 2025/0187424 A1 Jun. 12, 2025

Related U.S. Application Data

(60) Provisional application No. 63/722,447, filed on Nov. 19, 2024, provisional application No. 63/683,538, (Continued)

(51) Int. Cl.
*A01D 69/02* (2006.01)
*A01D 34/68* (2006.01)
(Continued)

(52) U.S. Cl.
CPC ............ *B60K 6/48* (2013.01); *A01D 34/6806* (2013.01); *A01D 2101/00* (2013.01)

(58) Field of Classification Search
CPC ............ A01D 34/6806; A01D 2101/00; A01D 34/76; A01D 69/025; B60K 6/48
See application file for complete search history.

(56) References Cited

U.S. PATENT DOCUMENTS 5,081,365 A 1/1992 Field et al.
6,109,127 A 8/2000 Liau
(Continued)

FOREIGN PATENT DOCUMENTS

CN 112005703 12/2020
CN 214430184 10/2021
(Continued)

OTHER PUBLICATIONS

International Search Report and Written Opinion for PCT/US2024/059914 dated Jun. 12, 2025, 11 pp.

*Primary Examiner* — Tisha D Lewis
(74) *Attorney, Agent, or Firm* — Neal, Gerber & Eisenberg LLP

(57) ABSTRACT

A parallel hybrid drive system for use with utility vehicles includes a battery-powered drive system and an internal combustion engine. The utility vehicle includes a mounting deck having one or more electric deck motors mounted thereon. Each deck motor receives electrical power from and is controlled by a dedicated deck motor controller. Each deck motor controller is in communication with a vehicle controller or a CAN bus connected to a vehicle integration module. Each deck motor includes a pulley and either a one-way mechanical or electric clutch so the deck motor(s) can be selectively belt-driven by the internal combustion engine. The power and control system of the parallel hybrid drive system is configured to return power to the battery source when the motor(s) are engaged by the internal combustion engine.

16 Claims, 23 Drawing Sheets

Related U.S. Application Data filed on Aug. 15, 2024, provisional application No. 63/553,008, filed on Feb. 13, 2024, provisional application No. 63/609,244, filed on Dec. 12, 2023.

(51) Int. Cl.

| | |
|---|---|
| ***B60K 6/48*** | (2007.10) |
| *A01D 101/00* | (2006.01) |

(56) References Cited

U.S. PATENT DOCUMENTS

| | | | | |
|---|---|---|---|---|
| 6,591,593 | B1 | 7/2003 | Brandon et al. | |
| 6,604,348 | B2 | 8/2003 | Hunt | |
| 7,017,327 | B2 | 3/2006 | Hunt et al. | |
| 9,787,225 | B2 | 10/2017 | Lucas et al. | |
| 10,493,835 | B2 | 12/2019 | Ito et al. | |
| 10,919,463 | B1 * | 2/2021 | Brown | H04W 4/48 |
| 11,211,844 | B1 | 12/2021 | Bonny et al. | |
| 2006/0063638 | A1 * | 3/2006 | Vitale | B60L 50/16 477/5 |
| 2008/0156555 | A1 | 7/2008 | Kluge et al. | |
| 2013/0268165 | A1 * | 10/2013 | Hashima | B60W 10/30 701/50 |
| 2014/0013722 | A1 | 1/2014 | Pitcel et al. | |
| 2021/0195834 | A1 * | 7/2021 | Arendt | G05D 1/0236 |
| 2022/0408638 | A1 * | 12/2022 | Ito | A01D 34/662 |
| 2025/0024776 | A1 | 1/2025 | Andrikanich et al. | |
| 2026/0042342 | A1 * | 2/2026 | Langenfeld | B60K 6/383 |

FOREIGN PATENT DOCUMENTS

| | | |
|---|---|---|
| EP | 1036957 | 12/2001 |
| EP | 2186392 | 5/2010 |
| EP | 2963256 | 1/2016 |

* cited by examiner

PARALLEL HYBRID SYSTEM WITH ELECTRIC MOTOR FOR VEHICLE

CROSS-REFERENCE

This application claims priority to U.S. Provisional Patent Application No. 63/722,447, filed on Nov. 19, 2024, U.S. Provisional Patent Application No. 63/683,538, filed on Aug. 15, 2024, U.S. Provisional Patent Application No. 63/553,008, filed on Feb. 13, 2024 and U.S. Provisional Patent Application No. 63/609,244, filed on Dec. 12, 2023. These prior applications are incorporated by reference herein in their entirety.

TECHNICAL FIELD

This application relates to a parallel hybrid power and control system for auxiliary motors of a utility vehicle. The system may be used with electric deck motor assemblies for a zero turn-radius (ZT) lawn mower or other applications.

BACKGROUND

Utility vehicles and/or their auxiliary implements may be powered by a traditional prime mover (e.g., an internal combustion engine or other combustion power source), may be purely electric, or may use some combination of a traditional engine and electric battery source, i.e., a “hybrid” system. Electric systems have the benefit of producing no emissions. Hybrid systems developed in large part due to concerns over perceived limited range/operating time of purely electric systems.

Hybrid systems may be series or parallel. A series hybrid system includes an engine, a generator powered by the engine, and one or more electric motors powered by the generator. This allows for constant and continuous power delivery, but is inefficient due to losses as energy is converted from mechanical to electrical and back again.

A parallel hybrid system uses an engine, a battery (or battery pack) to provide power to electric motor(s), and a power split device connecting the motor(s) and engine to the drive wheels. Either the electric motor or the engine or both can power the vehicle. When the battery power is low, the electric motor can be powered by the engine to charge the battery. Such a system can be efficient, but requires careful management of the engagement/disengagement of the engine to avoid depleting the battery. What is needed is application of an efficient parallel hybrid system to a utility vehicle equipped with auxiliary implements such as cutting blades on a lawn mower.

SUMMARY

A mowing vehicle having a parallel hybrid power and control system and utilizing one or more electric mowing deck motors, each having a pulley and a one-way clutch bearing, is disclosed herein. The deck motors can be driven electrically or by an engine-driven belt to enable utilization of the parallel hybrid power and control system.

A second embodiment of a mowing vehicle having a parallel hybrid power and control system and utilizing one or more electric mowing deck motors, each having a pulley and an electric clutch, is also disclosed herein. As in the first embodiment, the deck motors can be powered electrically or driven mechanically by an engine-driven belt to enable utilization of the parallel hybrid power and control system.

A third embodiment of a mowing vehicle having a parallel hybrid power and control system utilizing a single electric mowing deck motor having a pulley system and an electric clutch is also disclosed herein. In this embodiment, the single electric deck motor and one or more conventional deck spindles are belt-driven as a group. The deck motor can be powered electrically or driven mechanically by an engine-driven belt to enable utilization of the parallel hybrid power and control system.

A fourth embodiment of a mowing vehicle having a parallel hybrid power and control system utilizing one or more electric mowing deck motors, each having an input pulley but not having a clutch or one-way clutch bearing, is also disclosed herein. In this embodiment, the one or more electric deck motors (and one or more optional deck spindles) are belt-driven as a group. As in the other embodiments, the deck motor(s) can be powered electrically or driven mechanically by an engine-driven belt to enable utilization of the parallel hybrid power and control system. The mowing vehicle in this embodiment includes an internal combustion engine with a conventional electromagnetic power take-off clutch mounted on its output shaft to drive the electric mowing deck motors mechanically.

Each of the electric deck motor assemblies may be a mid-mount deck motor assembly and may be configured with or without a Hall effect board. In the embodiments of the electric motor assemblies disclosed herein, motor mounting features are integrally formed on an upper housing and positioned such that, when the motor is mounted on a mowing deck, a substantial portion of the electric motor is situated below the mowing deck and exposed to cooling air flow generated by the rotation of mower blades of the mowing deck during operation. The mounting surfaces have threaded holes formed therein so the deck motors can be seated on top of the mowing deck but fastened from the underside of the deck along with the mower blades for a more efficient assembly process (i.e. allowing a mower manufacturer to fasten blades and deck motors to the deck at one assembly station without flipping the deck over at that assembly station).

The electric deck motors described herein may also be referred to more generally as “power take-off motors” or “PTO motors.” While the disclosures herein relate to a mowing vehicle, a person of ordinary skill in the art will appreciate that the parallel hybrid power and control systems described herein could be implemented with other utility vehicles that perform other auxiliary functions different than rotating a mowing blade. For example, instead of a mower the machine may be for snow removal and the PTO motor may power an auger to gather and expel snow. The machine may be a utility vehicle and the PTO motor(s) may power various auxiliary implements such as a mixer, a broom for street cleaning, or other auxiliary implements that can be driven via an output shaft. In such other applications, it will be understood that the “mowing deck” referred to herein would be more broadly referred to as a “mounting deck.” Accordingly, the terms “mounting deck” and “mowing deck” are used synonymously herein.

A better understanding of the disclosure herein will be obtained from the following detailed description and accompanying drawings.

DETAILED DESCRIPTION OF THE DRAWINGS

The description that follows describes, illustrates and exemplifies one or more embodiments in accordance with its principles. This description is not provided to limit the disclosure to the embodiment(s) described herein, but rather to explain and teach the principles of the invention(s) disclosed herein to enable one of ordinary skill in the art to understand these principles and, with that understanding, be able to apply them to practice not only the embodiment(s) described herein, but also any other embodiment that may come to mind in accordance with these principles. The scope of the disclosure is intended to cover all such embodiments that may fall within the scope of the appended claims, either literally or under the doctrine of equivalents.

It should be noted that the drawings set forth herein are not necessarily drawn to scale and, in some instances, proportions may have been exaggerated to depict certain features more clearly. Positional references such as "upper" and "lower" may be used in regard to certain components to aid in understanding but are not to be construed as limiting since these components and the drive units in which they are housed may be oriented in various ways depending on the application in which they are used. As stated above, this specification is intended to be taken as a whole and interpreted in accordance with the principles of the invention(s) as taught herein and understood by one of ordinary skill in the art.

Figure 1:
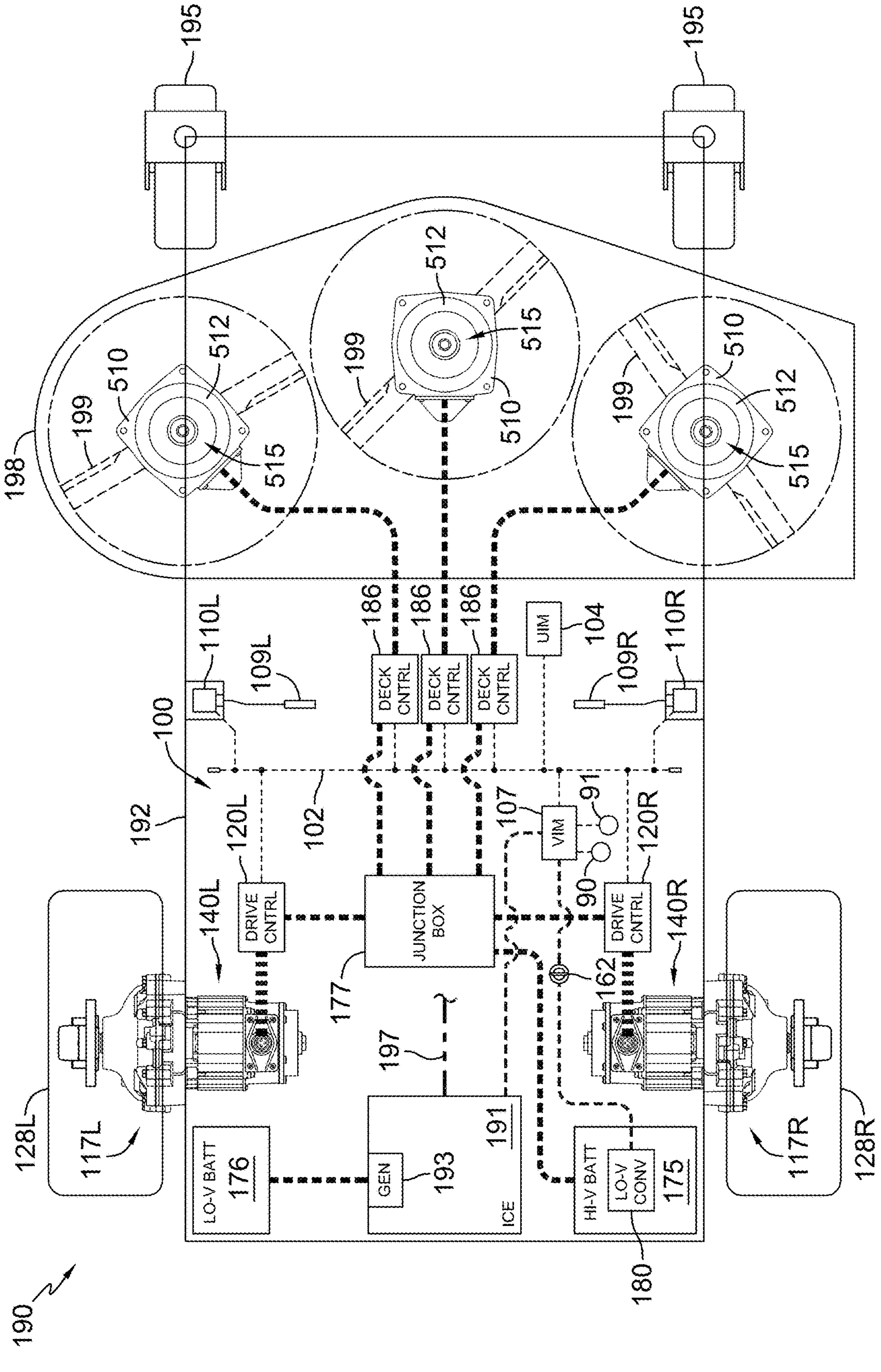
FIG. 1 is a schematic view of a first embodiment of a representative vehicle including a mowing deck and utilizing the parallel hybrid system of the instant disclosure.

FIG. 1 depicts a parallel hybrid, zero turn-radius mowing vehicle 190 that incorporates one or more electric deck motors 510 (three deck motors shown) that may be powered electrically or driven by an engine-driven belt 197. A second embodiment of an electric deck motor assembly 810 subsequently described herein may be substituted for deck motor assembly 510 in any vehicle embodiment or operational mode utilizing one or more deck motor assemblies 510. In each of the embodiments disclosed herein, belt 197 may be a belt system or belt and pulley system, may comprise more than one belt, and may include additional belt-drive components, such as belt tensioners, etc., as needed. Various belt and pulley systems are known in the art and will not be described in detail herein. An electric mid-mount deck motor, similar to those depicted herein, (but without an input pulley, clutch or one-way clutch bearing) is illustrated and described in more detail in commonly-owned U.S. patent application Ser. No. 18/900,385, the terms of which are incorporated herein by reference. It should be noted that electric motor configurations other than the "mid-mount" configurations illustrated herein may be used with the input pulley assemblies and one-way clutch configurations disclosed herein.

Hybrid mowing vehicle 190 includes a vehicle frame 192; an internal combustion (IC) engine 191 with a generator or alternator 193 to maintain charge (e.g., 12V) of a low voltage battery 176; a mowing deck 198 comprising belt-drive components (not shown) to drive deck motors 510 as a group when powered by the IC engine 191 via belt 197; a pair of caster wheels 195; a CAN (controller area network)

bus 102; left and right operator controls such as lap bars 109L, 109R comprising left and right lap bar sensor modules 110L, 110R connected to the CAN bus; a vehicle integration module (VIM) 107; and a high voltage battery or battery pack 175 (e.g., 48V, 58V, 88V, etc.) that can be connected to an external battery charging unit or charging station (not shown). Vehicle 190 also includes left and right electrically powered reduction drive units 117L, 117R that include electric drive motors 140L, 140R, respectively, that are connected to and controlled by left and right traction drive controllers 120L, 120R. The reduction drive units 117L, 117R (a.k.a. "traction drives" or "traction drive units") separately drive left and right driven wheels 128L, 128R. Mowing deck 198 may feature one or more mower blades 199. Each mower blade 199 is powered by an electric deck motor 510 that is electrically connected to and independently controlled by a dedicated deck motor controller 186. It should be noted that deck motor controllers 186 may be housed individually or as a group within a single deck motor controller housing or protective structure. Deck motor controllers 186 and drive motor controllers 120L, 120R are all connected to CAN bus 102 and receive high voltage DC power via junction box 177 connected to high voltage battery pack 175. Deck motor controllers 186 and drive motor controllers 120L, 120R convert incoming DC power to provide three-phase power output to the deck motors 510 and the electric drive motors 140L, 140R of reduction drive units 117L, 117R.

High voltage battery pack 175 includes a low voltage converter 180 (e.g., 12V). A vehicle power key switch 162 is electrically interposed between low voltage converter 180 and VIM 107. The VIM 107 is connected to CAN Bus 102 and a deck power switch 90 (a.k.a. "power take-off" or "PTO" switch) is connected to VIM 107 to enable and disable operation of the electric deck motors 510 via deck motor controllers 186.

An operational mode or power mode switch 91 for switching between two or more vehicle operational modes may also be connected to VIM 107. Optionally, or in addition to power mode switch 91, a user interface module 104 (e.g., an interface module including a touch-screen display) connected to the CAN bus 102 may be used to switch between or among the two or more vehicle operational modes.

Operational modes of vehicle 190 (and other vehicle embodiments described herein) may include, among other possible modes, a Hybrid (Standard Operation) Mode, an EV Mode, and a Power Mode, as described below. Each mode will have an associated Min SOC (Minimum State of Charge) and Max SOC (Maximum State of Charge). These limits are set at levels designed to reduce stress on the batteries and extend battery life. They may be configurable in relation to the desired run-time parameters of a particular application.

Hybrid (Standard Operation) Mode: In this mode, which is typically the default or standard mode, hybrid mowing vehicle 190 will operate solely under electric power when the high voltage battery SOC is greater than the minimum set SOC (for example, 30%). During this time, the traction drives 117L, 117R and deck motors 510 will be driven solely by electric power. When the SOC of high voltage battery 175 drops below the Min SOC setpoint (e.g., 30%), engagement of the PTO switch 90 will cause the VIM 107 to command the IC engine 191 to start. VIM 107 will send this command automatically if the PTO switch 90 is already engaged when the SOC drops below the Min SOC setpoint. Alternatively, VIM 107 may command the IC engine 191 to start and run based on various vehicle sensor inputs, such as ambient temperature or battery SOC levels, and engine run configuration parameters.

IC engine 191 directly drives the belt 197 configured to drive the one or more deck motors 510 via belt power through an input pulley assembly 512 with an attached one-way clutch bearing 515 (also known as a "sprag clutch" or "sprag clutch bearing"). In a second embodiment of a hybrid mowing vehicle 290, each electric deck motor 610 is driven through an input pulley assembly 612 including an electric clutch 615. IC engine 191 is configured to run only when the PTO switch 90 is engaged and PTO safety and operational parameters are met. IC engine 191 receives load from deck motors 510 when engine-driven input speed of deck motors 510 reaches the electrically-driven input speed of deck motors 510 or when the VIM 107 switches the power mode of electric deck motor controllers 186 from "motoring" to "generating." In the second embodiment vehicle 290 (see FIG. 9), IC engine 191 receives load from deck motors 610 when IC engine 191 reaches a set target speed monitored by VIM 107, and VIM 107 commands one or more electric clutches 615 to engage. VIM 107 may then switch the power mode of deck motor controllers 186 from "motoring" to "generating" [and vice versa], as programmed. In some vehicle embodiments, electric clutches 615 may also be selectively engaged or disengaged [individually or as a group] by the vehicle operator or in response to sensor or camera communication with the VIM 107.

In "generating mode," the VIM 107 will monitor RPM output of the IC engine 191 and, once VIM 107 verifies engine 191 is at full speed, VIM 107 will command the deck motors 510 connected to the engine-driven belt 197 to begin generating power back to the high voltage battery 175. The power generation to battery 175 will be increased to the peak output unless the deck motor controllers 186 sense a reduction in RPM of the deck motors 510. If deck motor RPM decreases, the deck motor controllers 186 will reduce generation load (i.e., the load directed toward recharging the high voltage battery 175), and thereby allow more IC engine power to drive the mower blades 199. If deck motor RPM continues to decrease, the deck motor controllers 186 can shift deck motors 510 to "motoring mode" where they temporarily draw power from the high voltage battery 175 to increase the available electric deck motor power above that supplied by the IC engine 191 (see also "Power Mode" below). Once the generation of power recharges the high voltage battery to the Max SOC (for example, 80%), the vehicle will return to operating under fully electric power until the battery SOC returns to Min SOC and the re-charge cycle starts again.

EV Mode: In this mode of operation, the Min SOC of high voltage battery 175 would be reduced (to 10%, for example) to extend the electric-only run time. When the battery reaches Min SOC, the deck motors 510 will shut down to preserve battery power for transportation, and vehicle 190 can either be switched to Hybrid Mode to recharge the high voltage battery 175 or taken to a recharge station.

Power Mode: The selection of Power Mode may be useful in times of extreme operation wherein the IC engine 191 and electric deck motors 510 cooperate to keep the motor output shaft 525 rotating at a target RPM. This mode will start the IC engine 191 if all safety conditions are acceptable and the PTO switch 90 is enabled. The IC engine 191 will run at all times in this mode when the PTO function is enabled. The deck motor controllers 186 will operate the deck motors 510 in either "generating mode" (charging high voltage battery 175) or "motoring mode" (pulling power from high voltage battery 175) depending on the load on the IC engine 191 and the SOC of the battery pack 175. The SOC for this mode may be set to a higher point (for example, 60%) up to a Max SOC setpoint (for example, 90%). In this mode, the IC engine 191 will continue running as long as the PTO switch 90 is enabled and the necessary conditions are met for vehicle operation.

In addition to SOC, during operation of the deck motors 510, VIM 107 monitors the consumed current from each system controller (e.g., deck motor controllers 186, left and right traction drive controllers 120L, 120R) and from high voltage battery 175. The parallel hybrid system has configurable operation time limits for any high current operations. In order to reduce the load during such operations, the system when in EV Mode, will reduce the vehicle speed at a configured deceleration rate until the load on the system drops to a configurable limit. Once the load is sufficiently reduced, the vehicle ramps speed back up in a controlled manner. When in Hybrid Mode during high current operations, instead of slowing the vehicle speed, the system will utilize the IC engine 191 to supplement the vehicle electrical power demand on high voltage battery 175. When the load from mowing (or other auxiliary) operations reduces, VIM 107 will shut down ICE 191 and ready it for restarting when necessary based on load or battery SOC.

It will be understood that vehicles 190 and 290 (as well as vehicles 390 and 490 discussed below) may include other steering and drive input systems, such as a steering wheel and accelerator pedal, joystick, remote control, etc. The above-described parallel hybrid drive and control system could be used on a vehicle having steerable front wheels connected to a rack-and-pinion steering mechanism and/or a vehicle having a single motor driving both rear wheels. It will also be understood that the parallel hybrid drive and control system 100 illustrated in FIG. 1 comprises the electrical components and functions shown and may comprise additional electrical components and functions not shown (e.g., sensors, cameras, GPS receiver, Bluetooth module, inertial measurement unit, path controller, battery management system, remote control transceiver, safety interlock switches, etc.). Drive and control system 100 and related components of vehicle 190 shown herein can also be used in an autonomous vehicle.

It will further be understood that the electric deck motors 510, 610, 610*a*, 710, 810 disclosed herein may be used in other vehicle applications (e.g., without a CAN bus 102; with a vehicle controller in lieu of VIM 107; with a power take-off function other than mowing; in a vehicle having a single electric transaxle and a single drive controller).

An electric motor assembly 510 suitable for mounting on the mowing deck 198 of mowing vehicle 190, and enabling the functionality of the parallel hybrid system disclosed herein, is shown in FIGS. 2-8. Motor assembly 510 includes an input pulley assembly 512 comprising pulley 513 and a sealed, one-way clutch bearing 515. The input pulley assembly 512 is mounted on the upper end of electric motor output shaft 525 (see FIG. 5) and retained by a retaining washer 526 and threaded fastener 527 (see FIG. 2). Threaded fastener 527 passes through a central hole 513*a* in pulley 513 (see FIG. 7) to engage an upper threaded bore 525*a* of output shaft 525. Retaining washer 526 seats against the inner race 515*a* of one-way clutch bearing 515, such that motor output shaft 525 rotates with inner race 515*a*. As described more fully below, the one-way clutch 515 is captured within pulley hub 529, which is, in turn, riveted to the pulley 513, such that the pulley 513 rotates with the outer race 515*b*.

Figure 2:
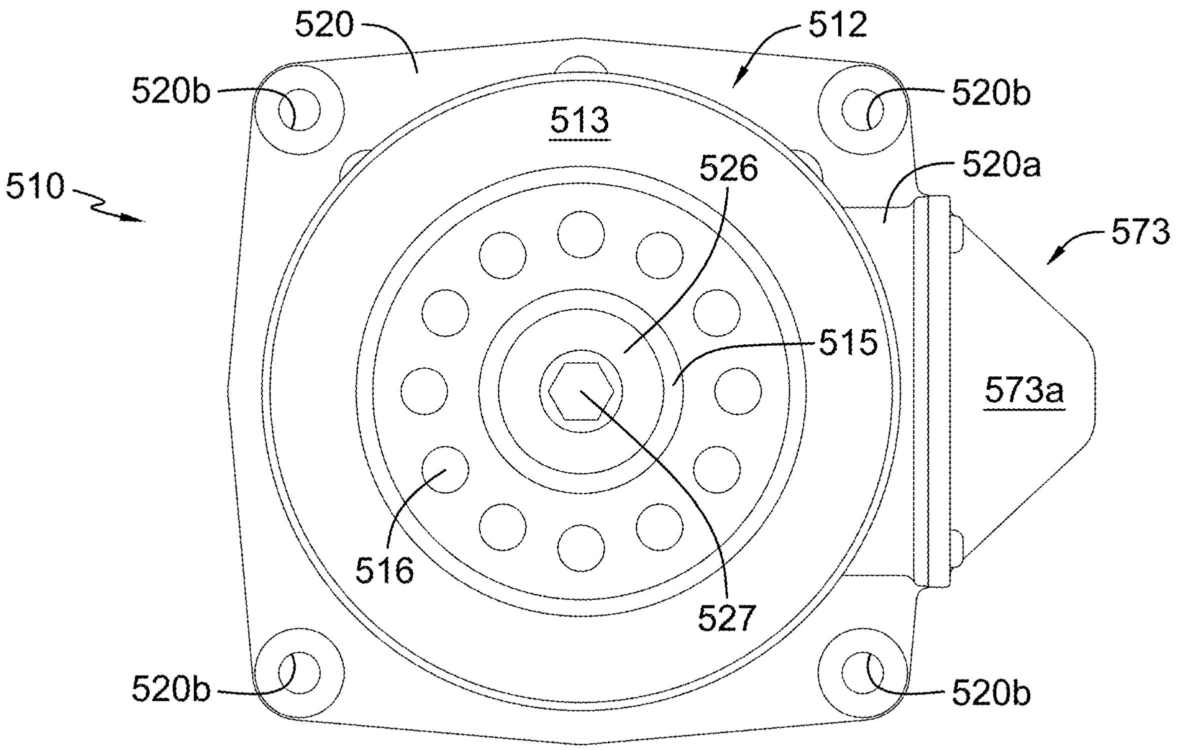
FIG. 2 is a top plan view of a first embodiment of an electric deck motor assembly that may be used on the mowing deck of the vehicle of FIG. 1 to drive mower blades.

As illustrated, a motor output cap 530 (lower housing) is joined to a motor end cap 520 (upper housing) via fasteners 518, with a motor stator housing 517 (middle housing) interposed between motor output cap 530 and motor end cap 520 to form an electric motor compartment containing electric motor 521. As shown in FIG. 2, motor end cap 520 includes threaded mounting holes 520*b* to attach electric deck motor 510 to mowing deck 198 of vehicle 190. In the exemplary embodiment, motor stator housing 517 is a finned aluminum extrusion cut to a length dependent upon the number of laminations used to form the motor stator (not shown). The fins improve heat dissipation and provide stiffness but may not be required in some similar embodiments. Electric motor 521 comprises a motor stator, motor windings, and a motor rotor assembly that includes a motor rotor and magnets (electric motor components not shown). At the lower end of motor output shaft 525, for attachment of a mower blade 199, adapter mounting features such as lower threaded bore 525*c* and flats 525*d* are provided for securing a blade adapter by means of a mechanical fastener and mating flats formed on the blade adapter. Another common blade adapter interface that can be used in lieu of flats 525*d* is a keyway interface (not shown) that may allow shearing of a "key" in the event a mower blade strikes a solid object. A keyway interface may help prevent or reduce damage to electric deck motor assembly 510 in such an event.

Electric motor output shaft 525 extends through electric motor 521, motor end cap 520 and motor output cap 530. Electric motor output shaft 525 is supported by an upper bearing 575 located in motor end cap 520 adjacent to shaft seal 577 and by a lower sealed bearing 576 located in motor output cap 530. Splines 525*b* formed on motor output shaft 525 permanently secure the motor rotor assembly (not shown) to the motor output shaft 525 via press-fit.

Figure 3:
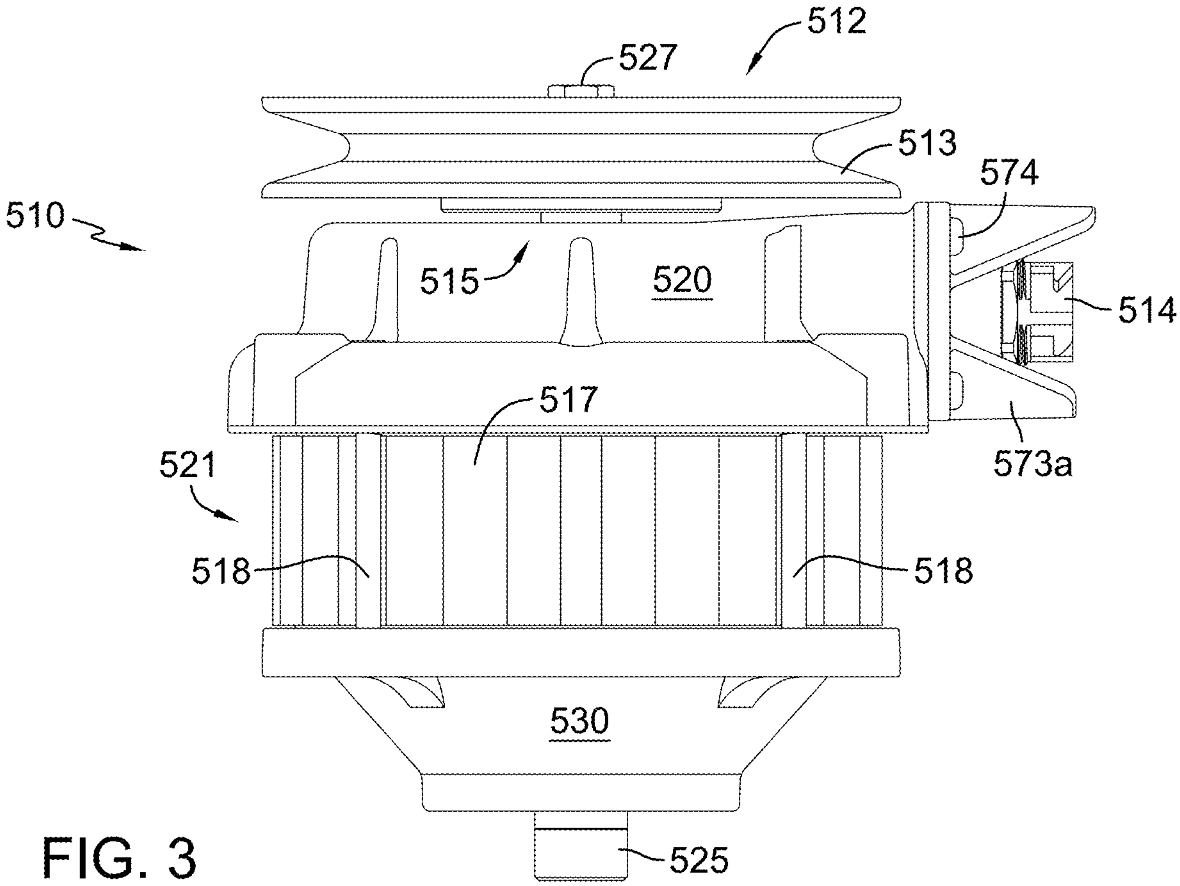
FIG. 3 is an elevational view of the electric deck motor assembly of FIG. 2.
Figure 4:
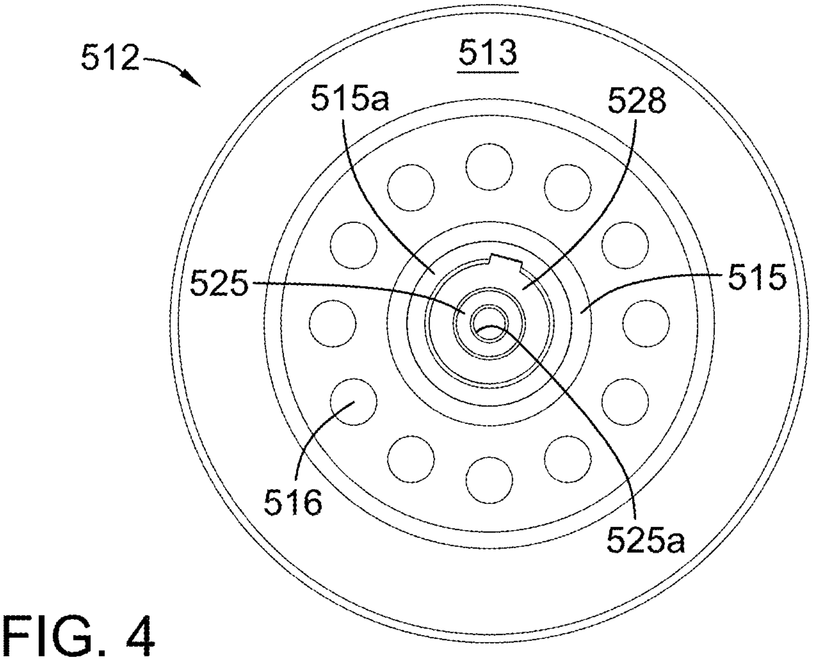
FIG. 4 is a top plan view of a pulley assembly with a one-way clutch bearing mounted on the motor output shaft of the electric deck motor assembly of FIG. 2, with a pulley retaining washer and fastener removed for clarity.
Figure 5:
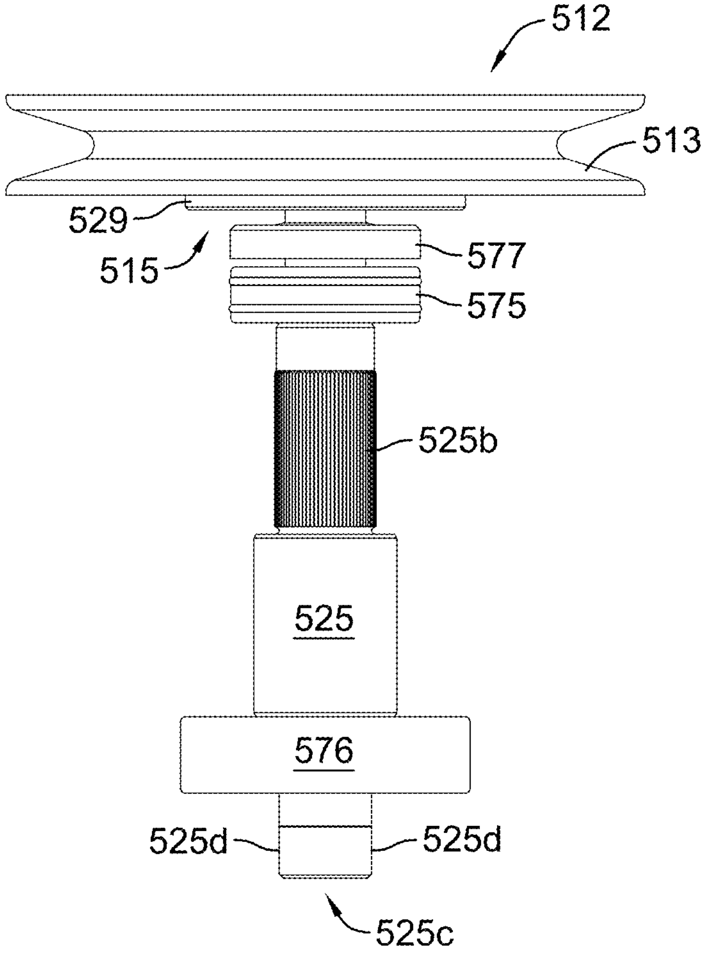
FIG. 5 is an elevational view of the pulley assembly and motor output shaft of FIG. 4, with shaft seal, upper bearing and lower sealed bearing.
Figure 6:
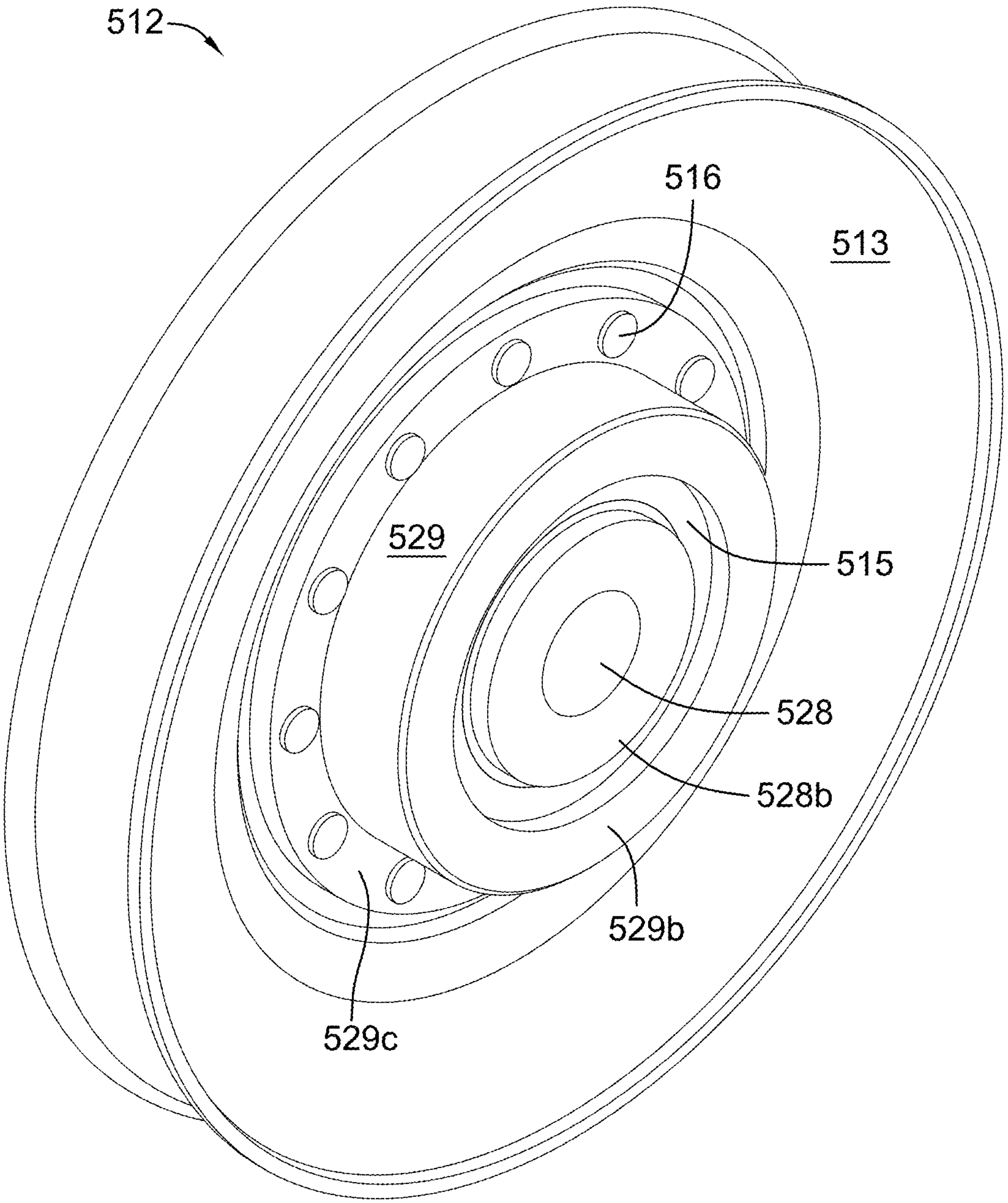
FIG. 6 is a perspective view of the underside of the pulley assembly of FIG. 5.

As shown in FIGS. 2 and 3, an environmentally sealed electrical connector 514 is attached or mounted to an electrical compartment cover 573. Compartment cover 573 includes connector guards 573*a* that extend beyond the sealed electrical connector 514 to protect it. Compartment cover 573 is secured by fasteners 574 to an electrical compartment 520*a* that may be integrally formed on the motor end cap 520.

As an option, a Hall effect board (not shown) may be attached to motor end cap 520 adjacent to the rotor assembly as illustrated and described in more detail in commonly-owned U.S. Pat. No. 11,211,844, which is incorporated by reference herein in its entirety. When configured with such a Hall effect board, electric motor assembly 510 can provide motor operational information (e.g., motor speed and temperature) to one or more electronic components of the vehicle control system.

An exemplary embodiment of input pulley assembly 512 is depicted in FIGS. 4 and 6-8. Input pulley assembly 512 includes a pulley hub 529 that houses the one-way clutch bearing 515. Bearing 515 comprises a bearing inner race 515*a* with inner keyway 515*c* and a bearing outer race 515*b* with outer keyway 515*d*. A mounting flange 529*c* of pulley hub 529 is attached to pulley 513 by means of rivets 516 but could also be attached with other types of fasteners such as screws into threaded housings or bolts through unthreaded housings. A hub key 529*a* of pulley hub 529 engages the outer bearing race keyway 515*d* such that pulley 513 rotates with the bearing outer race 515*b*. An adapter key 528*a* of a bearing adapter 528 engages the inner bearing race keyway 515*c* such that the electric motor output shaft rotates with the bearing inner race 515*a*. To help retain the one-way clutch bearing 515 and pulley 513 on output shaft 525, bearing adapter 528 includes a bearing inner race retention flange 528*b* and pulley hub 529 includes a bearing outer race retention flange 529*b*. During assembly, bearing adapter 528 is slipped onto the upper end of the motor output shaft 525 and is seated against shoulder 525*e* formed on output shaft 525. Bearing adapter 528 is retained along with the other components of input pulley assembly 512 when retaining washer 526 and fastener 527 are installed through the central hole 513*a* in pulley 513 and into threaded bore 525*a* of motor output shaft 525.

The motor output shaft 525 rotates independently when driven by electric power only and rotates with pulley 513 when pulley 513 is driven at sufficient speed by the IC engine that the pulley's RPM (outer race 515*b*) reaches (and matches) that of the output shaft (inner race 515*a*), causing the clutch function of the one-way clutch bearing 515 to engage. This causes the inner race and outer race to rotate together such that the input pulley assembly 512 drives the motor output shaft 525. With rotational speeds of pulley 513 and motor output shaft 525 matched, the connector sends power to the battery when the belt power to pulley 513 exceeds the load on the motor output shaft 525 (transferred from a deck motor blade 199, for example).

It should be noted that adapter key 528*a* may be integrally formed with bearing adapter 528, and hub key 529*a* may be integrally formed with pulley hub 529, as illustrated herein. Optionally, bearing adapter 528 and/or pulley hub 529 may comprise a keyway and have a separate key component, as is known in the art.

Figure 9:
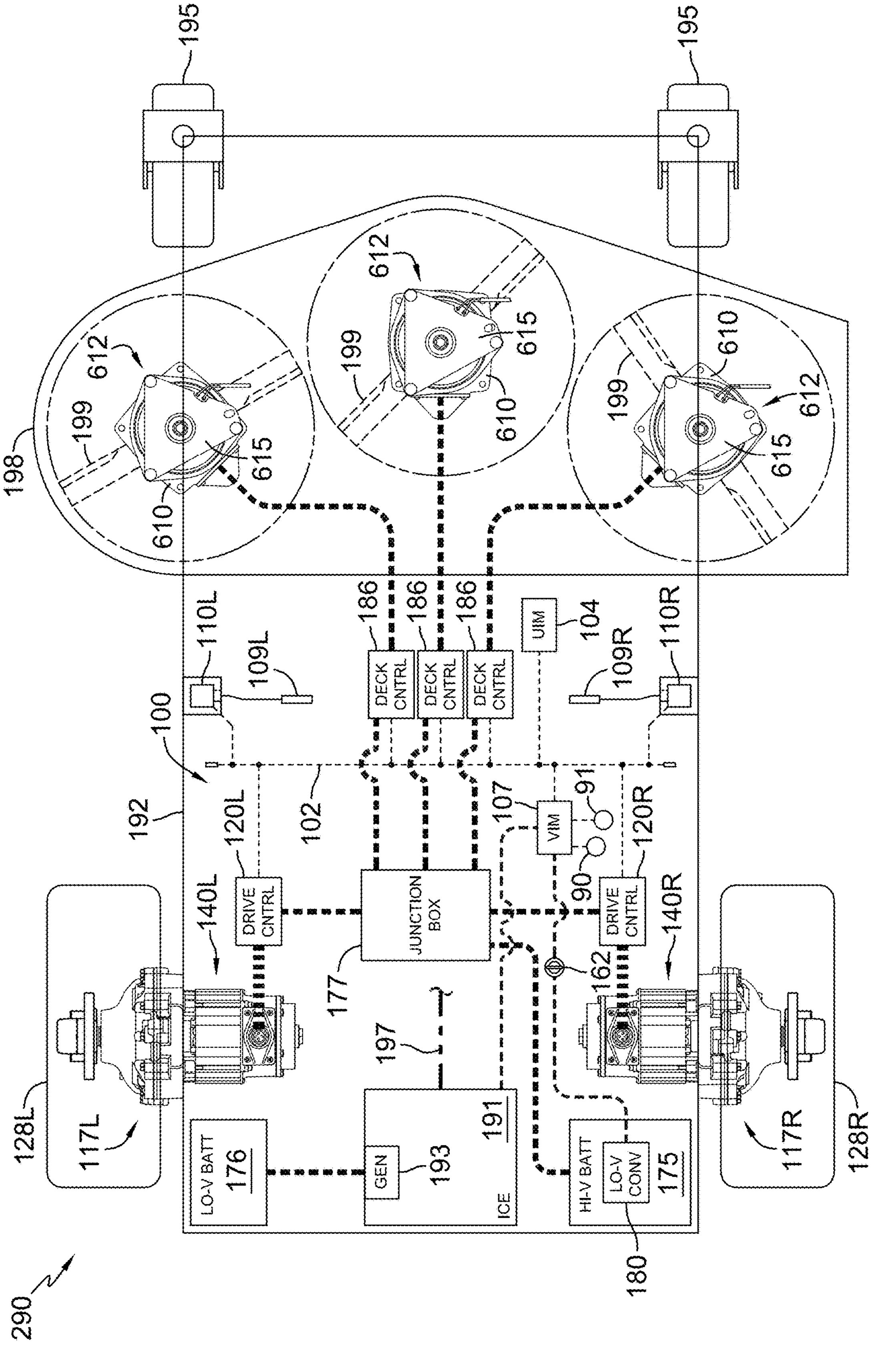
FIG. 9 is a schematic view of a second embodiment of a representative vehicle including a mowing deck and utilizing the parallel hybrid system of the instant disclosure.
Figure 9A:
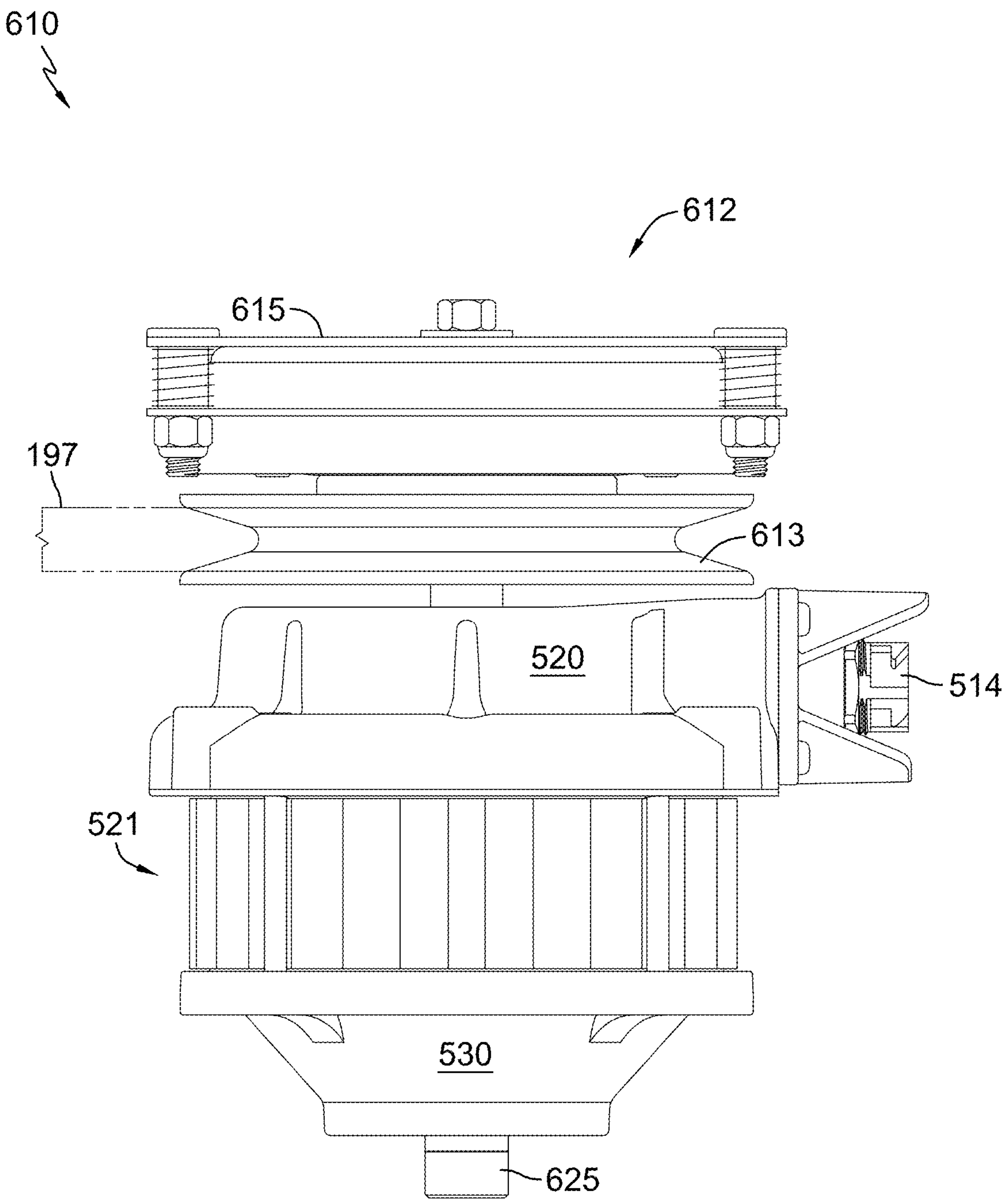
FIG. 9A is an elevational view of an electric deck motor assembly with an electric clutch that may be used on the mowing deck of the vehicle of FIG. 9 to drive mower blades.

FIG. 9 depicts a second embodiment of a parallel hybrid, zero turn-radius mowing vehicle 290 similar to vehicle 190 in most respects, but incorporating one or more electric deck motors 610 (three shown) having electric clutches. Motor assembly 610 (see FIG. 9A) includes input pulley assembly 612 (comprising an electric clutch 615 and input pulley 613) mounted on the motor output shaft 625. Electric clutch 615 may be a conventional electric clutch, such as a "Mobile Clutch" available from Ogura Industrial Corporation, 100 Randolph Road, Somerset, New Jersey 08873, for example. When an electric clutch 615 is disengaged, the corresponding electric deck motor 610 is driven electrically. When the electric clutch 615 is engaged, the corresponding electric deck motor 610 is driven mechanically by IC engine 191, and may also continue to be driven electrically. VIM 107 may be configured to engage and disengage electric clutches 615 together or individually.

Figure 10:
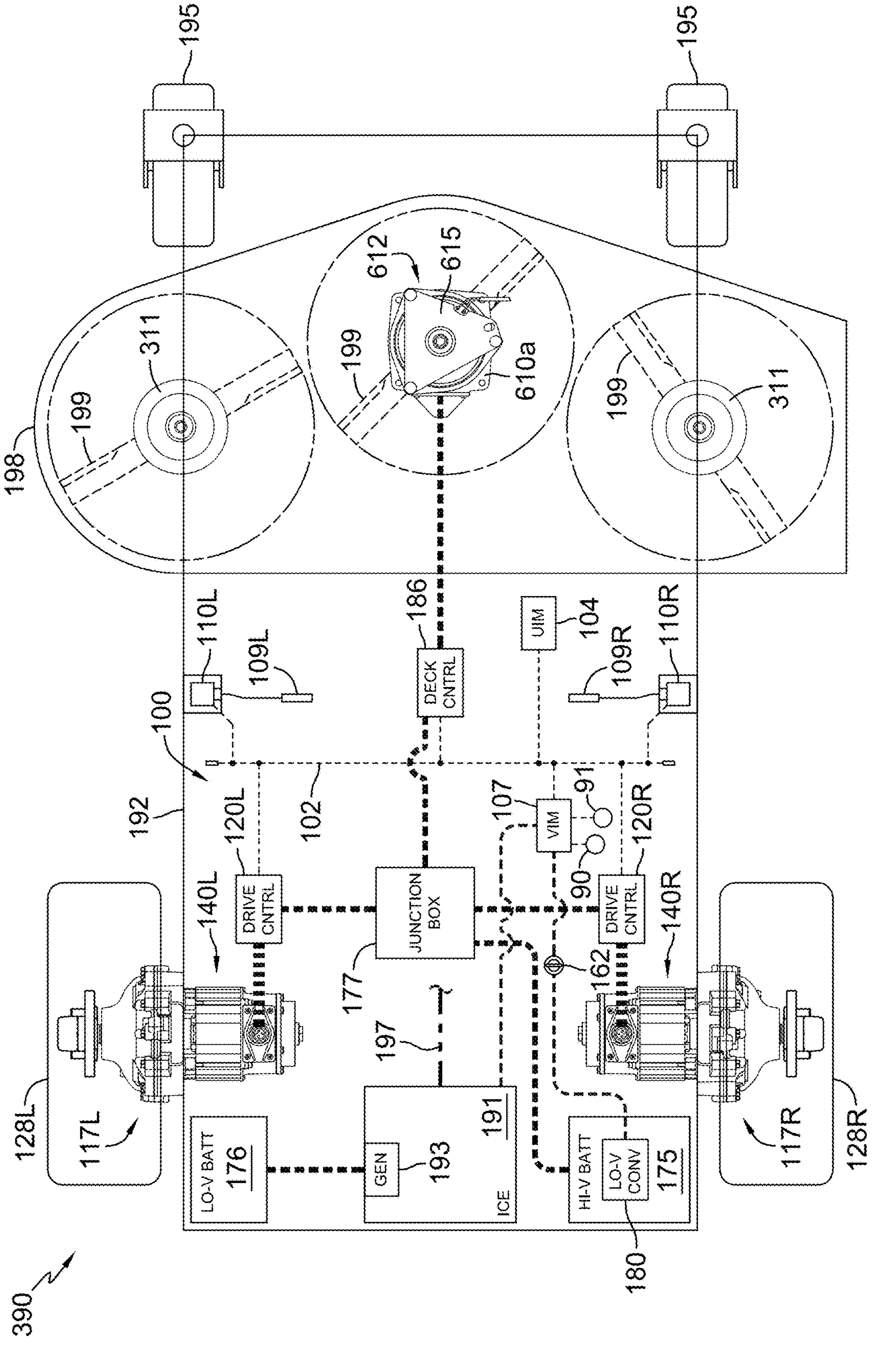
FIG. 10 is a schematic view of a third embodiment of a representative vehicle including a mowing deck and utilizing the parallel hybrid system of the instant disclosure.
Figure 10A:
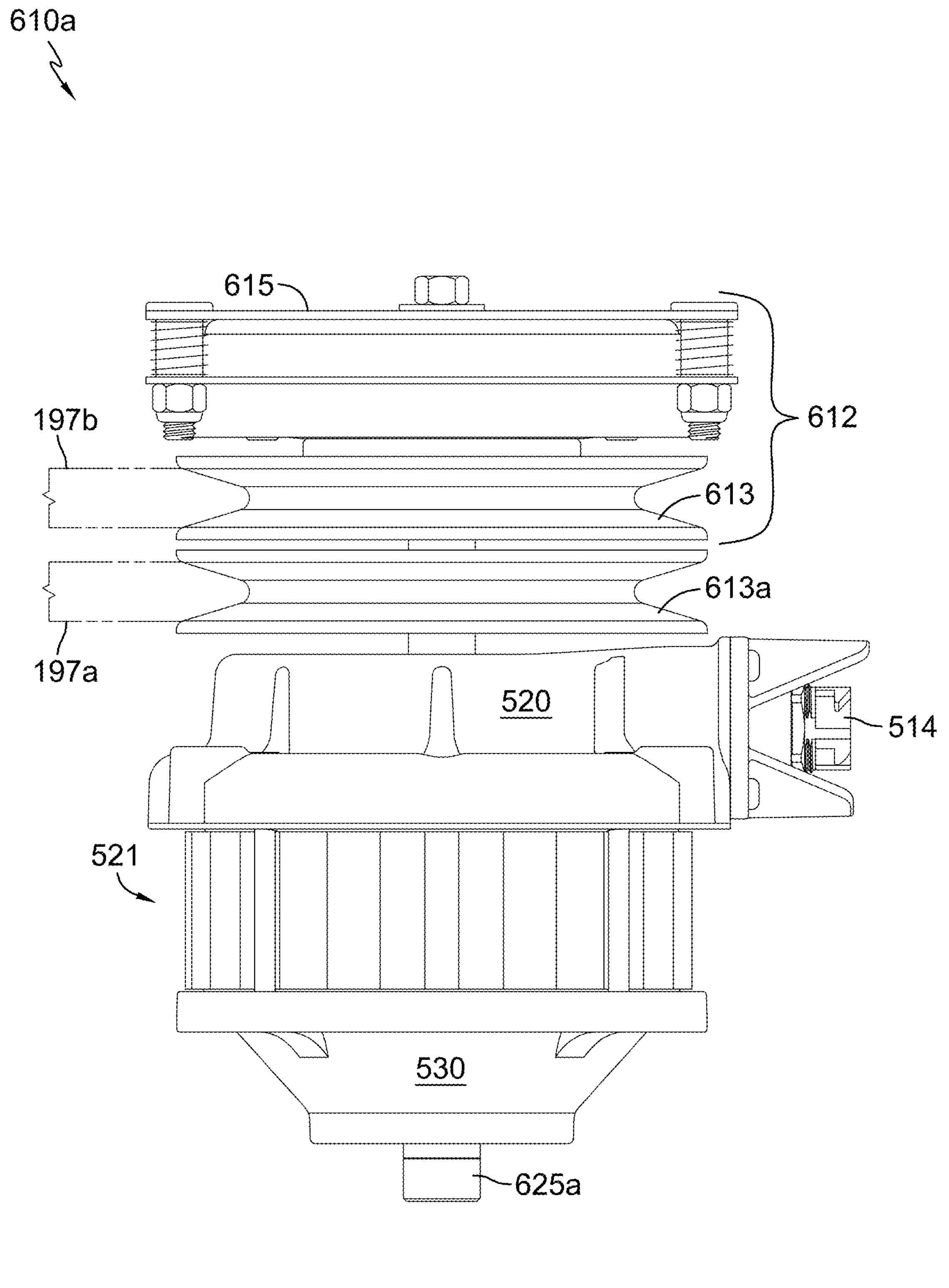
FIG. 10A is an elevational view of an electric deck motor assembly with an electric clutch and two pulleys, which may be used on the mowing deck of the vehicle of FIG. 10 to drive mower blades.

In a third embodiment of a parallel hybrid, zero turn-radius mowing vehicle 390 (see FIGS. 10 and 10A), a single electric deck motor assembly 610*a* (including input pulley assembly 612 and a second input pulley 613*a*) and one or more conventional deck spindles 311 (two shown) are driven by belt system 197. Input pulley 613*a* is fixed to the output shaft 625*a* of electric deck motor assembly 610*a*, and pulley 613 of input pulley assembly 612 is selectively engaged to the output shaft 625*a* via electric clutch 615. Belt system 197 comprises a first belt 197*a* connecting pulley 613*a* with the one or more conventional deck spindles 311 to enable electric powering of mowing deck 198. Belt system 197 further comprises a second belt 197*b* connecting IC engine 191 with pulley 613 to enable mechanical operation of mowing deck 198. As described above, IC engine 191 will run if all safety conditions are met. But in this embodiment, PTO switch 90 enables electric clutch 615 to mechanically power electric deck motor assembly 610*a* via IC engine 191. The operational modes of vehicle 390 may be the same as described above for vehicle 190 (with electric deck motor 510) or vehicle 290 (with electric deck motors 610).

Figure 11:
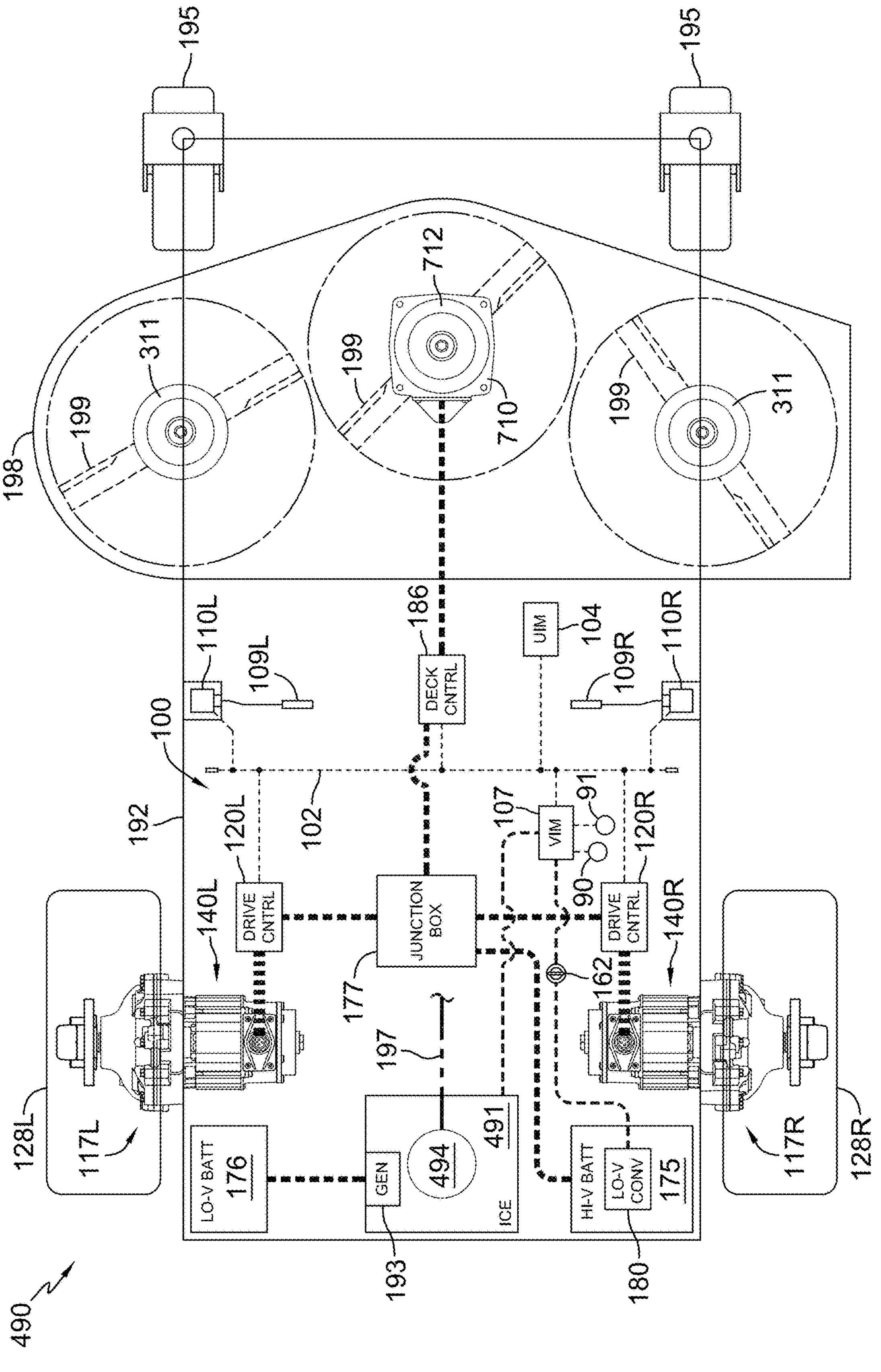
FIG. 11 is a schematic view of a fourth embodiment of a representative vehicle including a mowing deck and utilizing the parallel hybrid system of the instant disclosure.

In a fourth embodiment of a parallel hybrid, zero turn-radius mowing vehicle 490 (see FIG. 11), a conventional PTO clutch 494 may be mounted on the output shaft of IC engine 191, as is known in the art. Such electromagnetic "General Purpose Clutches" are also available from Ogura Industrial Corporation, for example. One or more electric deck motors 710 may be driven by engine-driven belt 197 through an input pulley 712 mounted on each deck motor output shaft 525. Similar to the third embodiment, mowing deck 198 may be configured with a single electric deck motor 710 (as shown) in combination with one or more conventional deck spindles 311 (two shown). Optionally, and similar to the first and second embodiments, mowing deck 198 may include one or more electric deck motors 710 (each having a dedicated deck motor controller 186) and may include unpowered, belt-driven deck spindles such as conventional deck spindles 311 driven by belt 197. Operational modes of vehicle 490 may include modes similar to those described above, except deck motors 710 do not include a clutch or one-way clutch bearing and IC engine 491 may also be configured to run at times when the PTO switch 90 is not engaged.

Figure 12:
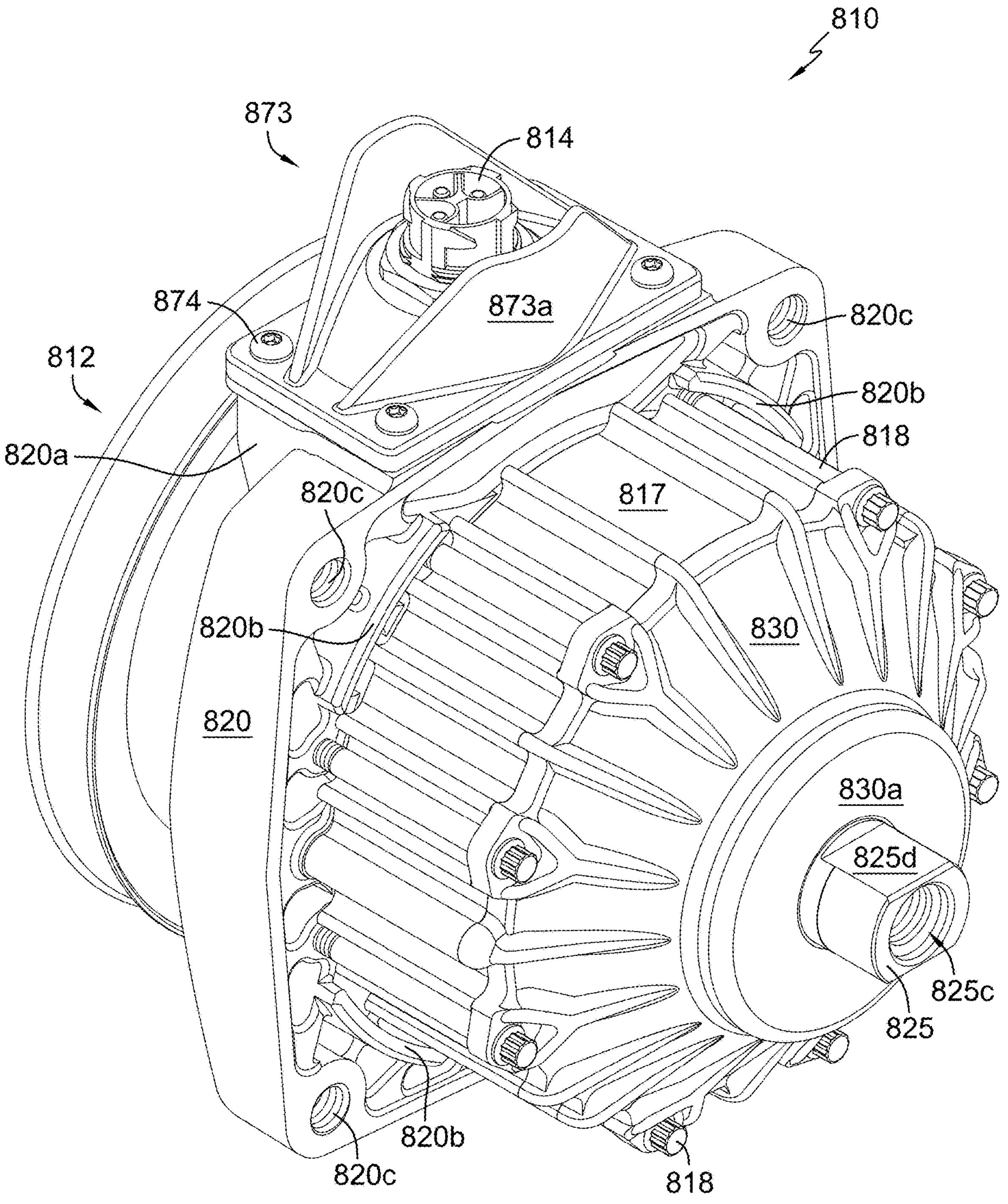
FIG. 12 is a perspective view of a second embodiment of an electric deck motor assembly that may be used on the mowing deck of the vehicle of FIG. 1 to drive mower blades.
Figure 13:
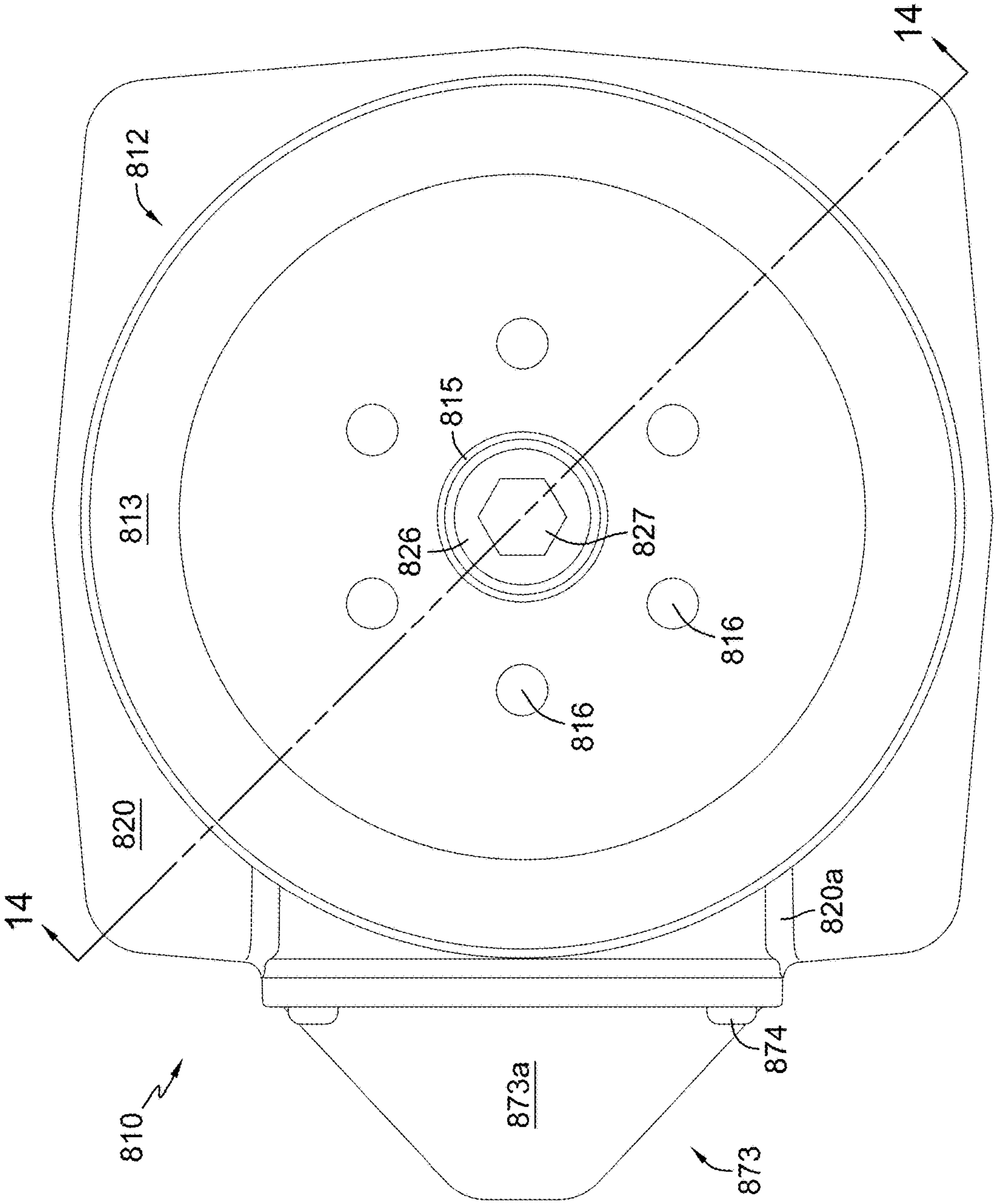
FIG. 13 is a top plan view of the electric deck motor assembly of FIG. 12.
Figure 14:
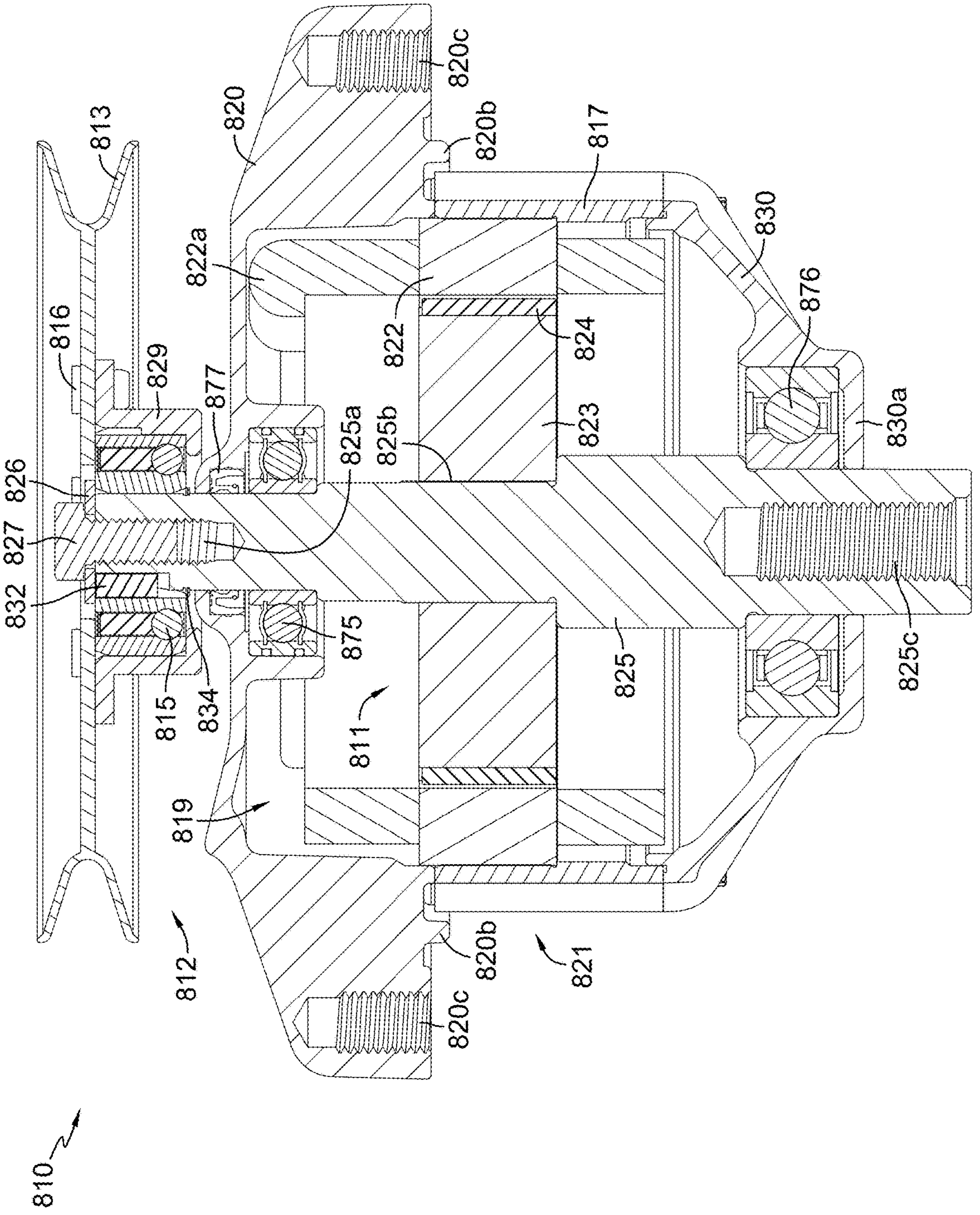
FIG. 14 is a cross-sectional view of the electric deck motor assembly of FIG. 13, along the line 14-14 in FIG. 13.

Another embodiment of an electric motor assembly 810 suitable for mounting on the mowing deck 198 of mowing vehicle 190, and enabling the functionality of the parallel hybrid system disclosed herein, is shown in FIGS. 12-14. Motor assembly 810 includes an input pulley assembly 812 comprising pulley 813 and a sealed, one-way clutch bearing 815. The input pulley assembly 812 is mounted on the upper end of electric motor output shaft 825 (see FIG. 15) and retained by a retaining washer 826 and threaded fastener 827 (see FIGS. 13 and 14). Threaded fastener 827 passes through a central hole 813*a* in pulley 813 (see FIG. 16) to engage an upper threaded bore 825*a* of output shaft 825. Retaining washer 826 seats against the inner race 815*a* of one-way clutch bearing 815, such that motor output shaft 825 rotates with inner race 815*a*. As described more fully below, the one-way clutch 815 is captured within pulley hub 829 which is, in turn, riveted to the pulley 813, such that the pulley 813 rotates with the outer race 815*b*.

As illustrated, a motor output cap 830 (lower housing) is joined to a motor end cap 820 (upper housing) via fasteners 818, with a motor stator housing 817 (middle housing) interposed between motor output cap 830 and motor end cap 820 to form an electric motor compartment 819 containing electric motor 821. In the exemplary embodiment, motor stator housing 817 is a finned aluminum extrusion cut to a length dependent upon the number of laminations used to form the motor stator (not shown). The fins improve heat dissipation and provide stiffness but may not be required in some similar embodiments. Electric motor 821 comprises a motor stator 822, motor windings 822*a* (approximate windings envelope shown), and a motor rotor assembly 811 that includes a motor rotor 823 and magnets 824. At the lower end of motor output shaft 825, for attachment of a mower blade 199, adapter mounting features such as lower threaded bore 825*c* and flats 825*d* are provided for securing a blade adapter by means of a mechanical fastener and mating flats formed on the blade adapter. Another common blade adapter interface that can be used in lieu of flats 825*d* is a keyway interface (not shown) that may allow shearing of a "key" in the event a mower blade strikes a solid object. A keyway interface may help prevent or reduce damage to electric deck motor assembly 810 in such an event.

Electric motor output shaft 825 extends through electric motor 821, motor end cap 820 and motor output cap 830. Electric motor output shaft 825 is supported by an upper bearing 875 located in motor end cap 820 adjacent to shaft seal 877 and by a lower sealed bearing 876 located in motor output cap 830. A bearing seal protection flange 830*a* is formed on motor output cap 830 and configured to fit closely around output shaft 825 to protect the lower sealed bearing 876. Splines 825*b* formed on motor output shaft 825 permanently secure the motor rotor assembly (not shown) to the motor output shaft 825 via press-fit.

As shown in FIG. 14, motor end cap 820 includes threaded mounting holes 820*c* to attach electric deck motor 810 to mowing deck 198 of vehicle 190. Pilot features 820*b* (ridges or protrusions) may be formed on motor end cap 820 as needed to help position each deck motor 810 in a deck motor opening during attachment of deck motor(s) 810 to a deck motor mounting surface of mowing deck 198. The threaded mounting holes 820*c* are formed on motor end cap 520 to enable mounting of the deck motor(s) 810 from the underside of mowing deck 198 along with attachment of mower blade(s) 199 for efficient assembly. The threaded mounting holes 820*c* do not penetrate the upper surface of motor end cap 820, thereby protecting the threads of motor mounting fasteners from corrosion and providing a smooth outer surface of motor end cap 820 that is easily cleaned and does not collect water, dirt and debris. Any holes that may be formed in motor end cap 820 (such as assembly aid holes, not shown) may be plugged.

As shown in FIGS. 12 and 13, an environmentally sealed electrical connector 814 is attached or mounted to an electrical compartment cover 873. Compartment cover 873 includes connector guards 873*a* that extend beyond the sealed electrical connector 814 to protect it. Compartment cover 873 is secured by fasteners 874 to an electrical compartment 820*a* that may be integrally formed on the motor end cap 820.

As an option, a Hall effect board (not shown) may be attached to motor end cap 820 adjacent to the rotor assembly as illustrated and described in more detail in commonly-owned U.S. Pat. No. 11,211,844, which is incorporated by reference herein in its entirety. When configured with such a Hall effect board, electric motor assembly 810 can provide motor operational information (e.g., motor speed and temperature) to one or more electronic components of the vehicle control system.

Figure 15:
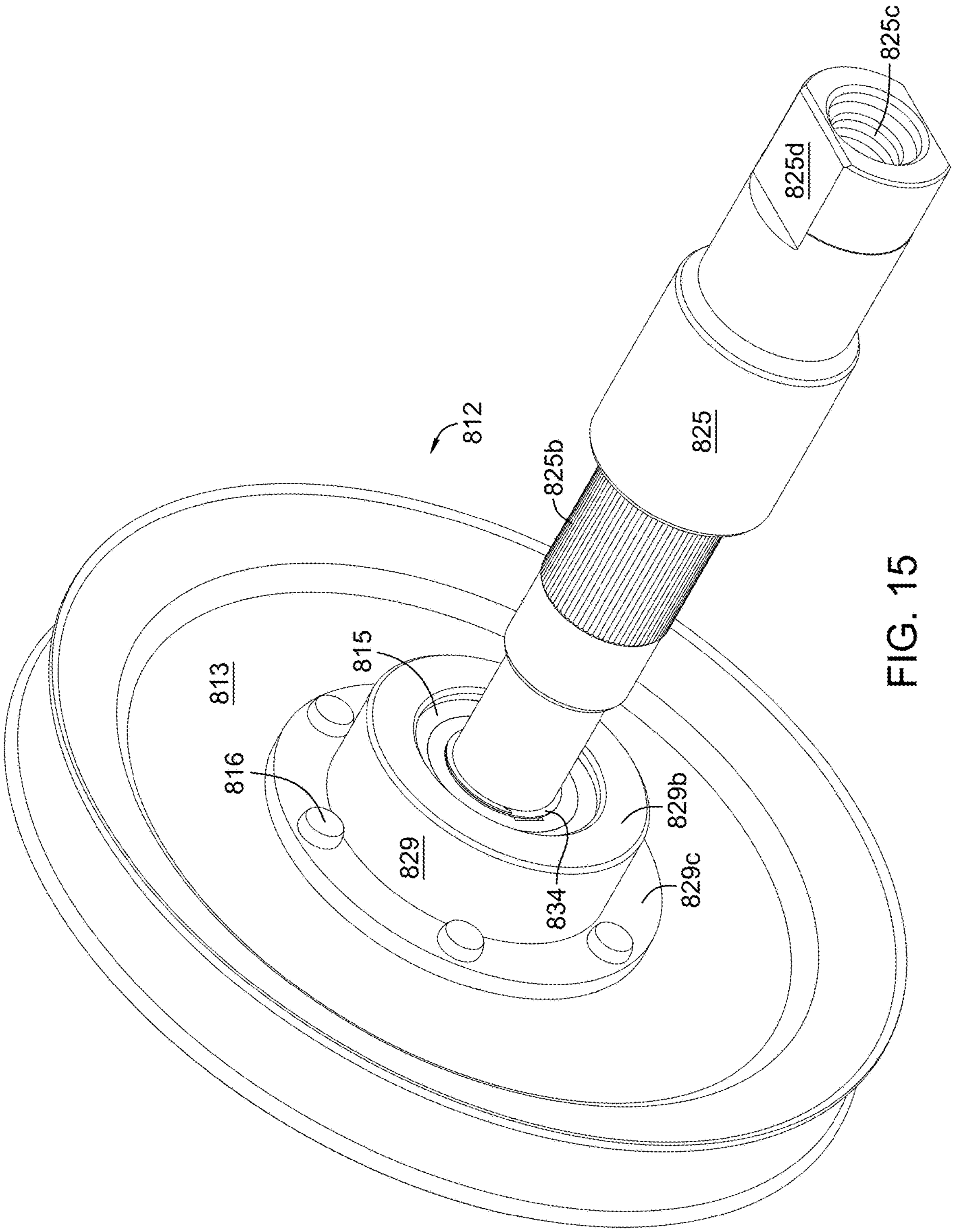
FIG. 15 is a perspective view of the underside of the pulley assembly of the electric deck motor assembly of FIG. 12 with the motor output shaft connected.
Figure 16:
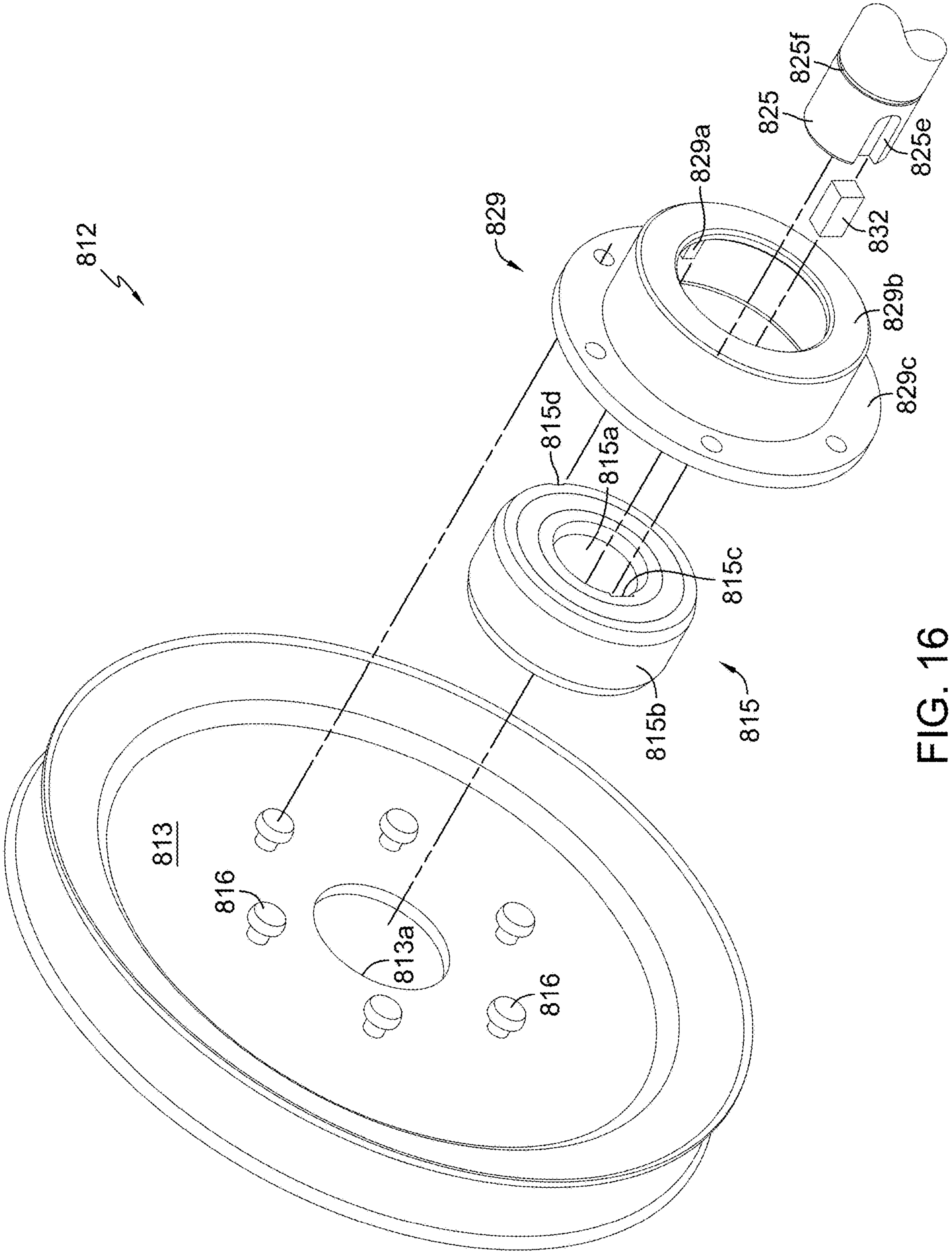
FIG. 16 is an exploded perspective view of the pulley assembly of FIG. 15.
Figure 17:
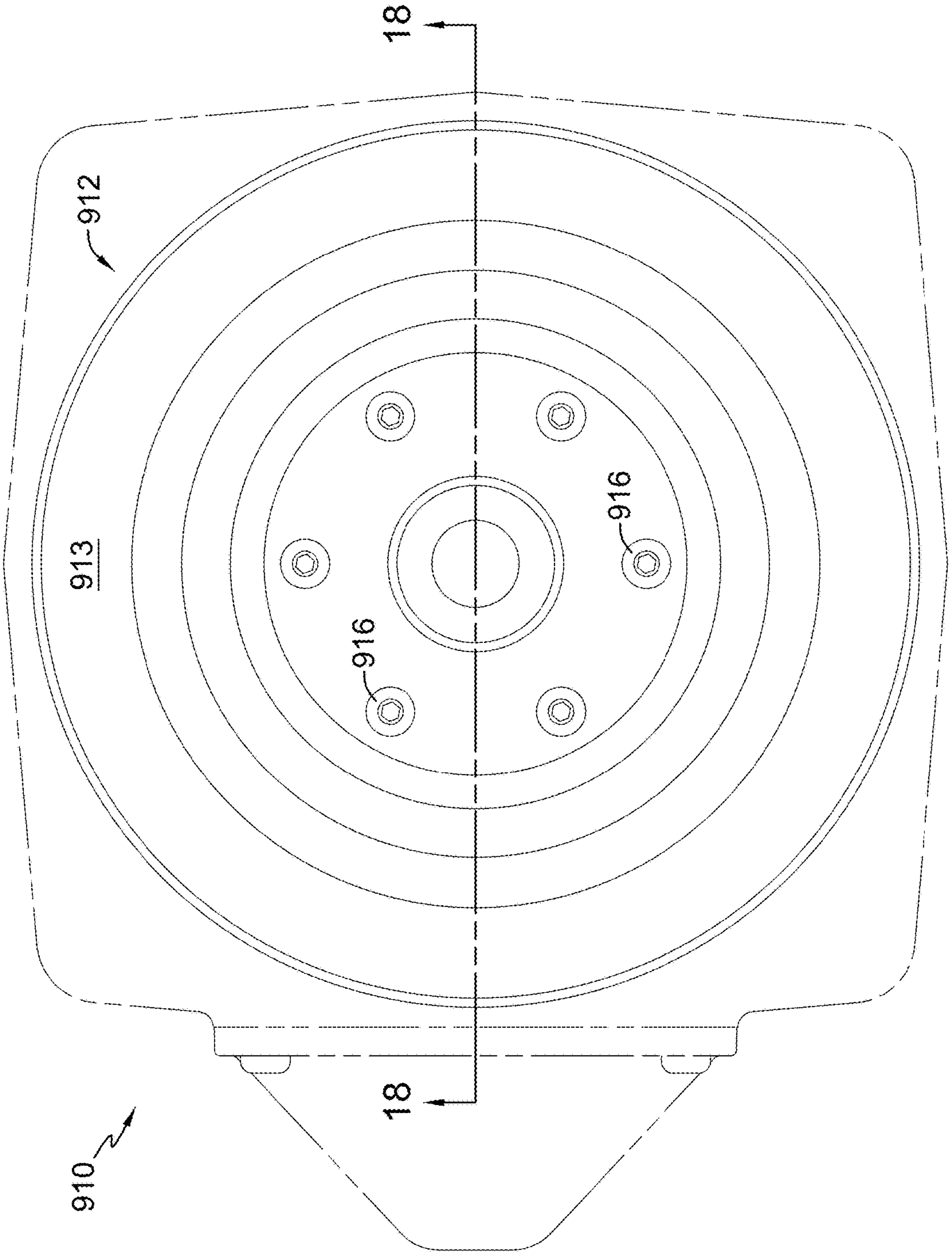
FIG. 17 is a top plan view of a third embodiment of an electric deck motor assembly with pulley assembly that may be used on the mowing deck of the vehicle of FIG. 1 to drive mower blades.

Input pulley assembly 812 is depicted in FIGS. 15 and 16. Input pulley assembly 812 includes a pulley hub 829 that houses the one-way clutch bearing 815. Similar to one-way clutch bearing 515, this bearing is also known as a "sprag clutch" or "sprag clutch bearing." Bearing 815 comprises a bearing inner race 815*a* with inner keyway 815*c* and a bearing outer race 815*b* with outer keyway 815*d*. A mounting flange 829*c* of pulley hub 829 is attached to pulley 813 by means of rivets 816 (shown upset/formed and in their installed location in both FIGS. 15 and 16), but could also be attached with other types of fasteners such as screws into threaded housings or bolts through unthreaded housings. A bearing outer race retention flange 829*b* of pulley hub 829 helps retain the bearing outer race 815*b*, and a hub key 829*a* of pulley hub 829 engages the outer bearing race keyway 815*d* such that pulley 813 rotates with the bearing outer race 815*b*. A key 832 engages the inner bearing race keyway 815*c* and the output shaft keyseat 825*e* of output shaft 825 such that the electric motor output shaft 825 rotates with the bearing inner race 815*a*. During assembly, bearing 815 is slipped onto the upper end of the motor output shaft 825 to seat against a retaining ring 834 installed in retaining ring groove 825*f*. Bearing 815 is retained along with the other components of input pulley assembly 812 when retaining washer 826 and fastener 827 are installed through the central hole 813*a* in pulley 813 and into threaded bore 825*a* of motor output shaft 825 as illustrated in FIG. 14. A shoulder similar to shoulder 525*e* shown in FIG. 7 may be formed on output shaft 825 in lieu of using retaining ring 834 illustrated in this embodiment.

Figure 7:
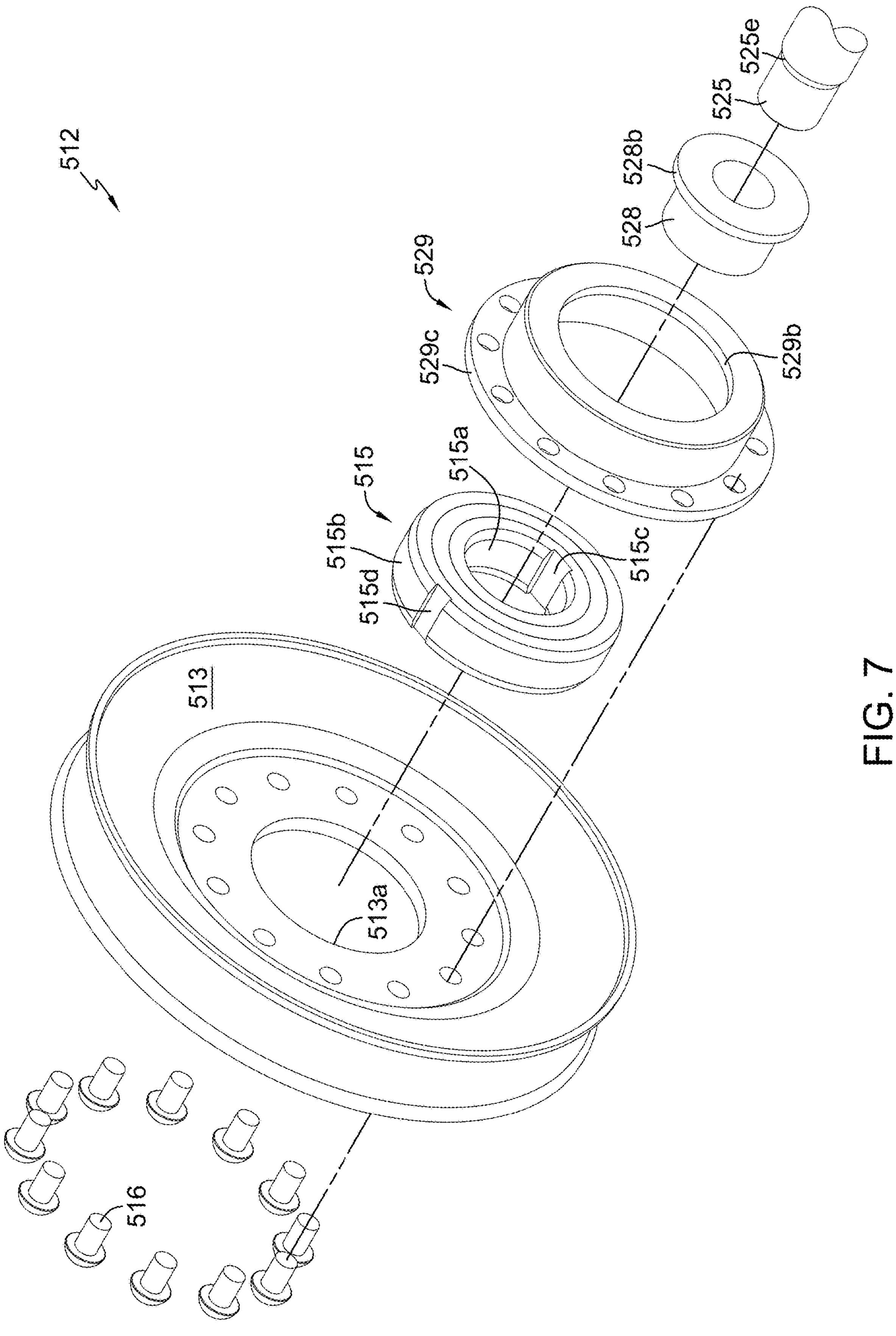
FIG. 7 is an exploded perspective view of the pulley assembly of FIG. 6.
Figure 8:
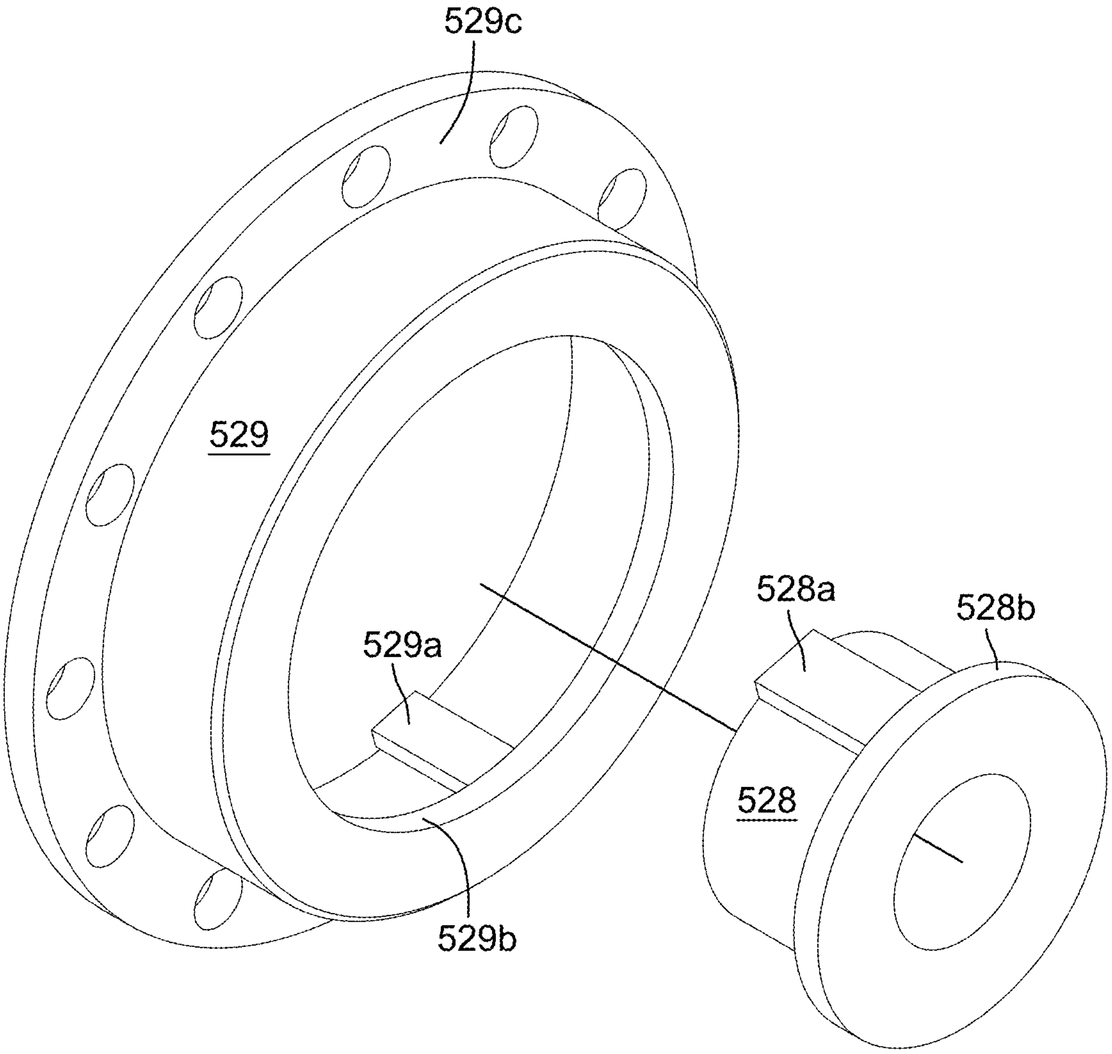
FIG. 8 is an exploded perspective view of a pulley hub and bearing adapter of the pulley assembly of FIG. 7, rotated 180 degrees about the rotational axis of the motor output shaft, as compared to FIG. 7.

As illustrated, electric motor assembly 810 does not utilize a bearing adapter such as bearing adapter 528 of FIG. 7. The inner diameter of inner race 815*a* of clutch bearing 815 is smaller than the inner diameter of inner race 515*a* of bearing 515 to the extent that such an adapter is not required. Optimal bearing size and associated output shaft interface diameter may differ based on desired bearing life and torque loads.

The motor output shaft 825 rotates independently when driven by electric power only and rotates with pulley 813 when pulley 813 is driven at sufficient speed by the IC engine that the pulley's RPM (outer race 815*b*) reaches (and matches) that of the output shaft (inner race 815*a*), causing the clutch function of the one-way clutch bearing 815 to engage. This causes the inner race and outer race to rotate together such that the input pulley assembly 812 drives the motor output shaft 825. With rotational speeds of pulley 813 and motor output shaft 825 matched, the connector sends power to the battery when the belt power to pulley 813 exceeds the load on the motor output shaft 825 (transferred from a deck motor blade 199, for example).

Another embodiment of an electric motor assembly 910 suitable for mounting on the mowing deck 198 of mowing vehicle 190, and enabling the functionality of the parallel hybrid system disclosed herein, is shown in FIGS. 17-23. Motor assembly 910 includes an input pulley assembly 912 comprising a pulley 913 and a pulley hub assembly 929. Other than input pulley assembly 912 and modification of the motor output shaft to accommodate mounting of pulley hub assembly 929, motor assembly 910 may be the same as the previously described motor assembly 810. The pulley hub assembly 929 includes a one-way clutch mechanism 915 that, similar to the sprag clutch bearings 515, 815, is a one-way torque transmitting device.

The pulley hub assembly 929 includes a pawl carrier (or hub housing) 931 containing an upper hub bearing 941 and a lower hub bearing 942, with a one-way clutch mechanism 915 sandwiched between the pair of sealed bearings 941, 942. Pulley hub assembly 929 is mounted on the upper end of electric motor output shaft 925 and is retained by a retaining washer 926 and threaded fastener 927 (see FIGS. 18 and 19). Threaded fastener 927 engages an upper threaded bore 925*a* of motor output shaft 925. Retaining washer 926 seats against the inner race 941*a* of upper hub bearing 941, and motor output shaft 925 rotates with inner race 941*a* and with inner race 942*a* of lower hub bearing 942. Inner race 942*a* seats against retaining ring 934 or, alternatively, against a shoulder formed on motor output shaft 925 similar to shoulder 525*e* shown in FIG. 7.

Pulley 913 is attached to the hub housing 931 by means of threaded fasteners 916 that extend through a plurality of holes 913*a* formed in pulley 913 to engage a plurality of threaded holes or bores 931*a* formed in hub housing 931, so pulley 913 rotates with the outer race 941*b* of upper hub bearing 941 and outer race 942*b* of lower hub bearing 942. Rather than having a central hole such as central hole 813*a* of pulley 813, pulley 913 includes a central dome 913*b* that protects and conceals pulley mounting fastener 927 and pulley hub assembly 929. The pulleys illustrated herein may include either a central hole or a central dome structure.

An upper O-ring 933 seals the upper perimeter of hub housing 931 and a lower O-ring 935 positioned near retaining ring 934 seals the interface between inner race 942*a* and motor output shaft 925. The combination of the domed pulley structure, the pair of sealed bearings, and upper and lower O-rings protects the input pulley assembly 912 from environmental contamination and damage. Grease or other lubrication may be used to further protect and extend the service life of the one-way clutch mechanism 915.

Hub housing 931 (a.k.a. pawl carrier 931) serves as a pawl carrier for the one-way clutch mechanism 915. The one-way clutch mechanism 915, comprising a ratchet and a plurality of pawls, is illustrated in FIGS. 20-23. Ratchet 951 is flanked by the upper and lower bearings 941, 942, includes a plurality of ratchet teeth 951*a*, and is installed on the upper end of the motor output shaft 925. Internal flats 951*b* formed on ratchet 951 interface with external upper flats 925*b* formed on the upper end of motor output shaft 925 so the ratchet 951 rotates with motor output shaft 925.

Figure 18:
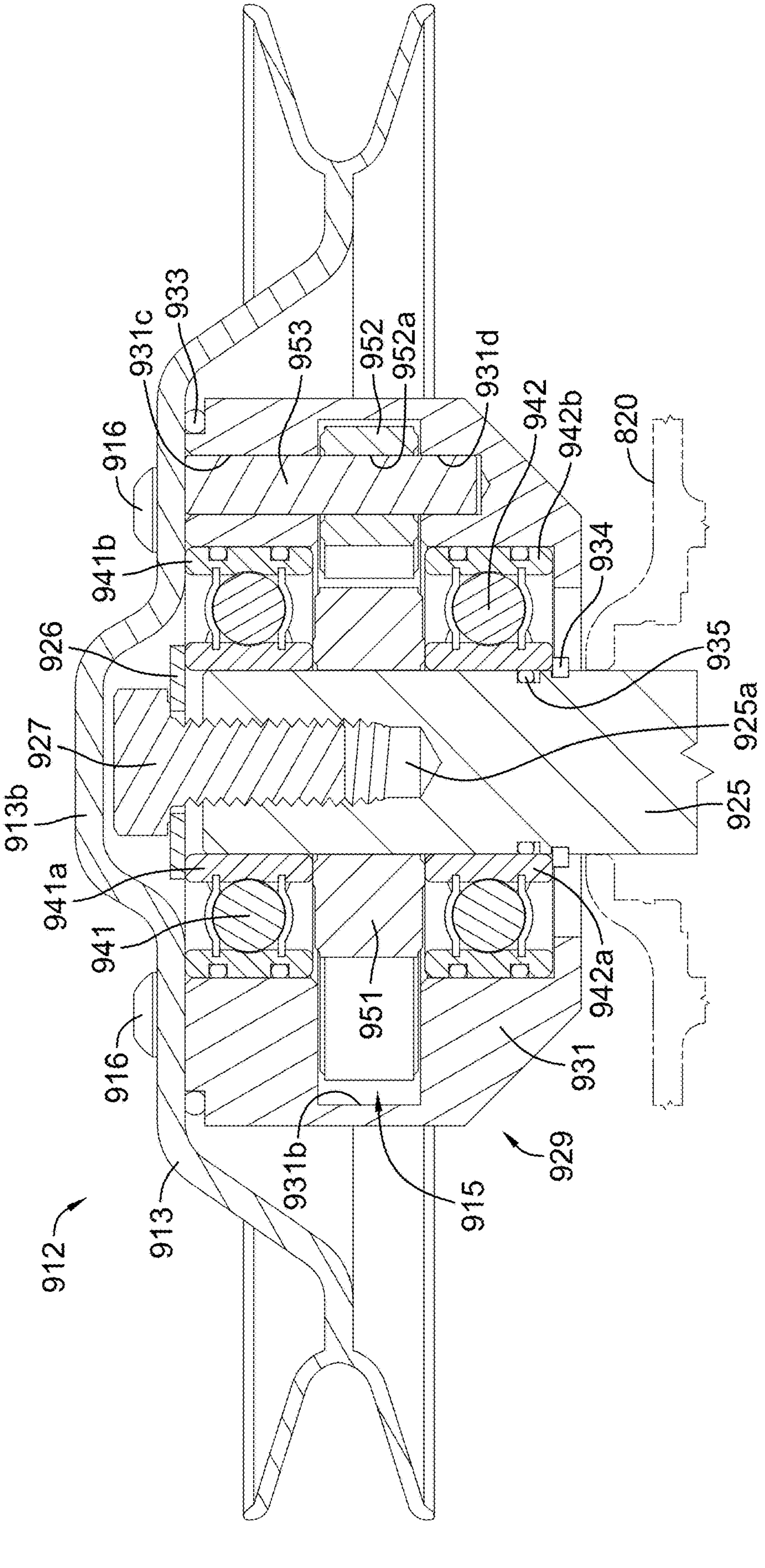
FIG. 18 is a cross-sectional view of the pulley assembly of the electric deck motor assembly of FIG. 17, along the line 18-18 in FIG. 17.
Figure 19:
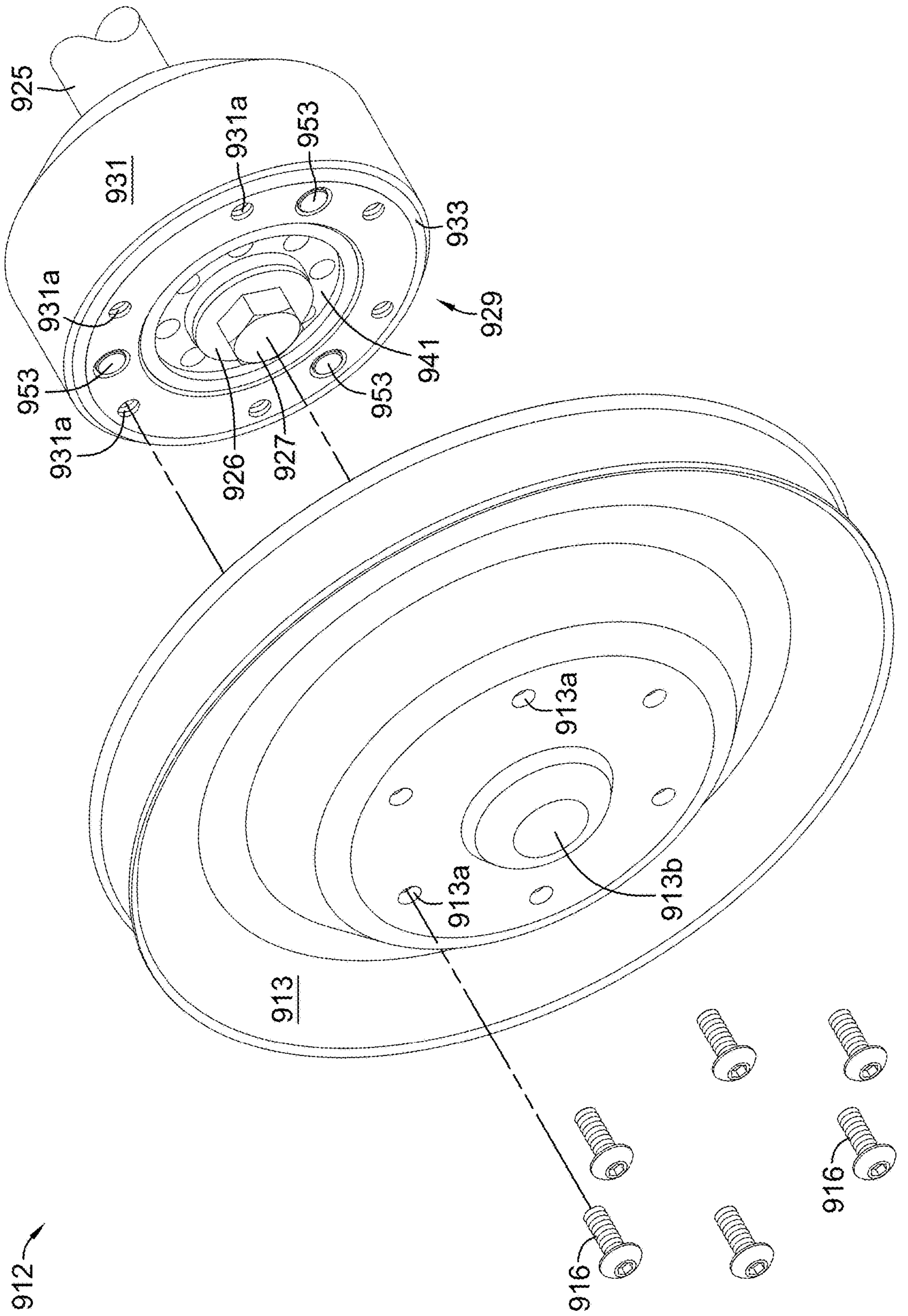
FIG. 19 is a partially exploded perspective view of the pulley assembly of the electric deck motor assembly of FIG. 17.
Figure 20:
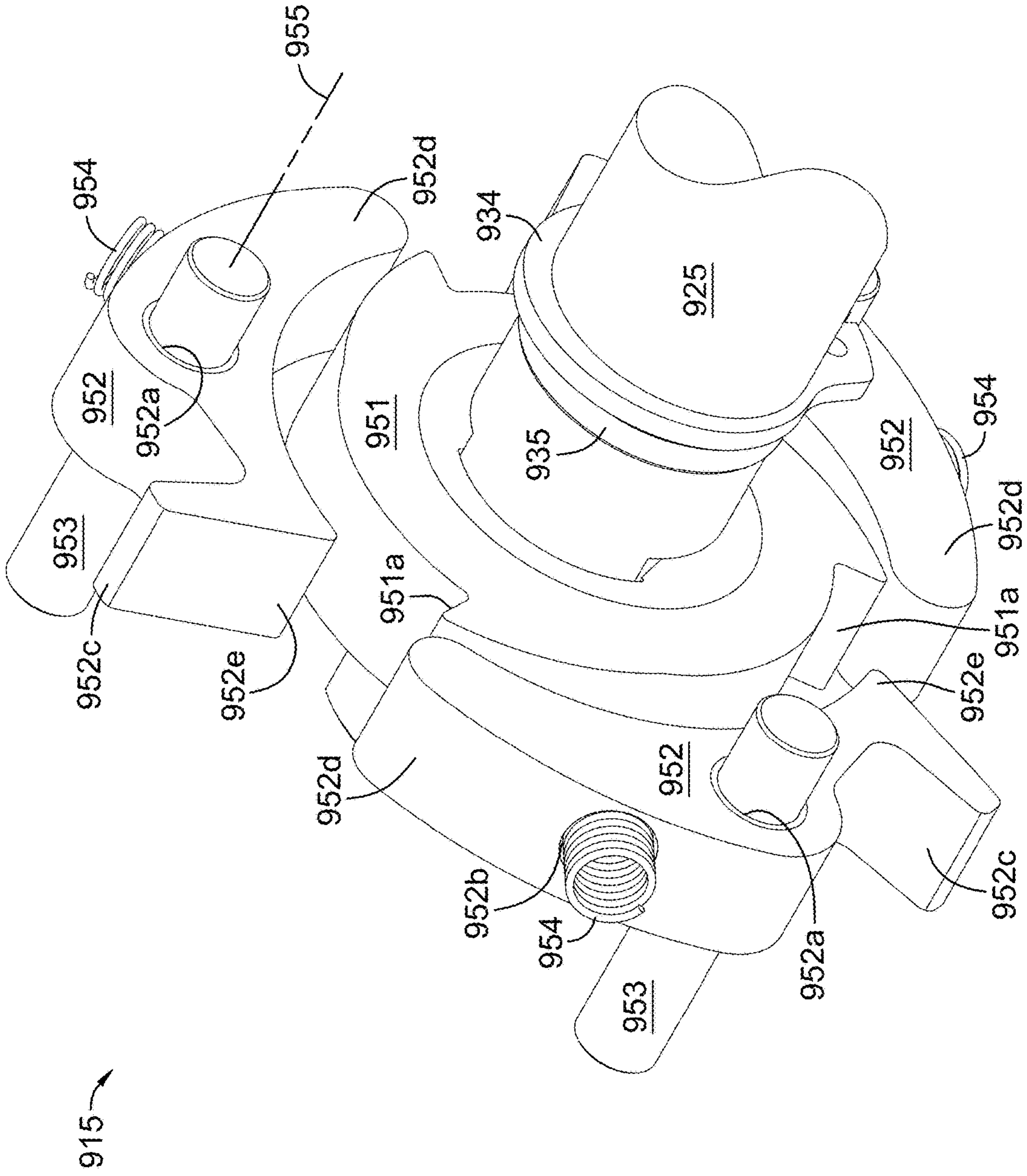
FIG. 20 is a perspective view of the lower side of the ratchet and pawls clutch mechanism of the pulley assembly of the electric deck motor assembly of FIG. 17, depicted in a disengaged state.
Figure 21:
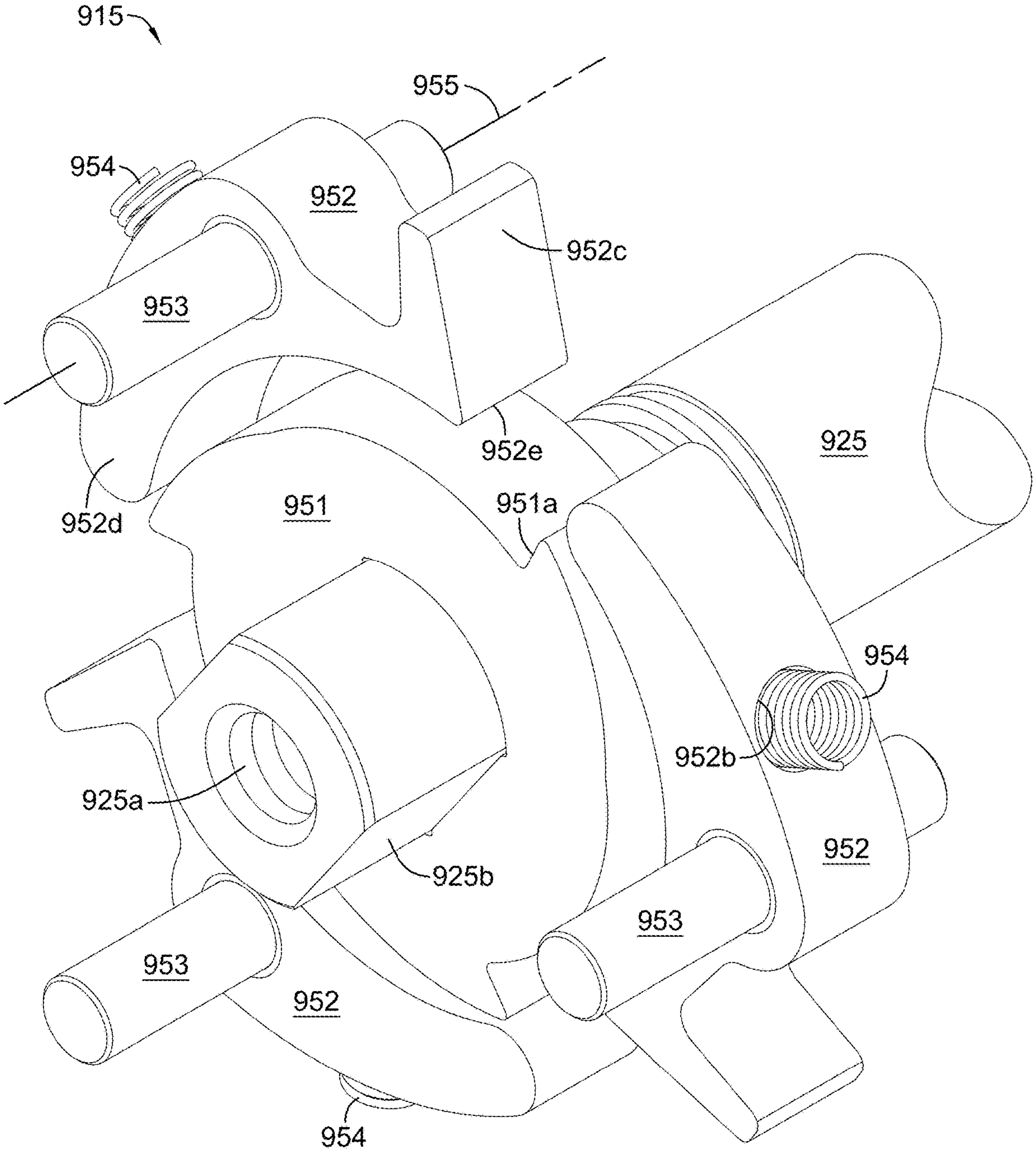
FIG. 21 is a perspective view of the upper side of the ratchet and pawls clutch mechanism of the pulley assembly of the electric deck motor assembly of FIG. 17, depicted in a disengaged state.
Figure 22:
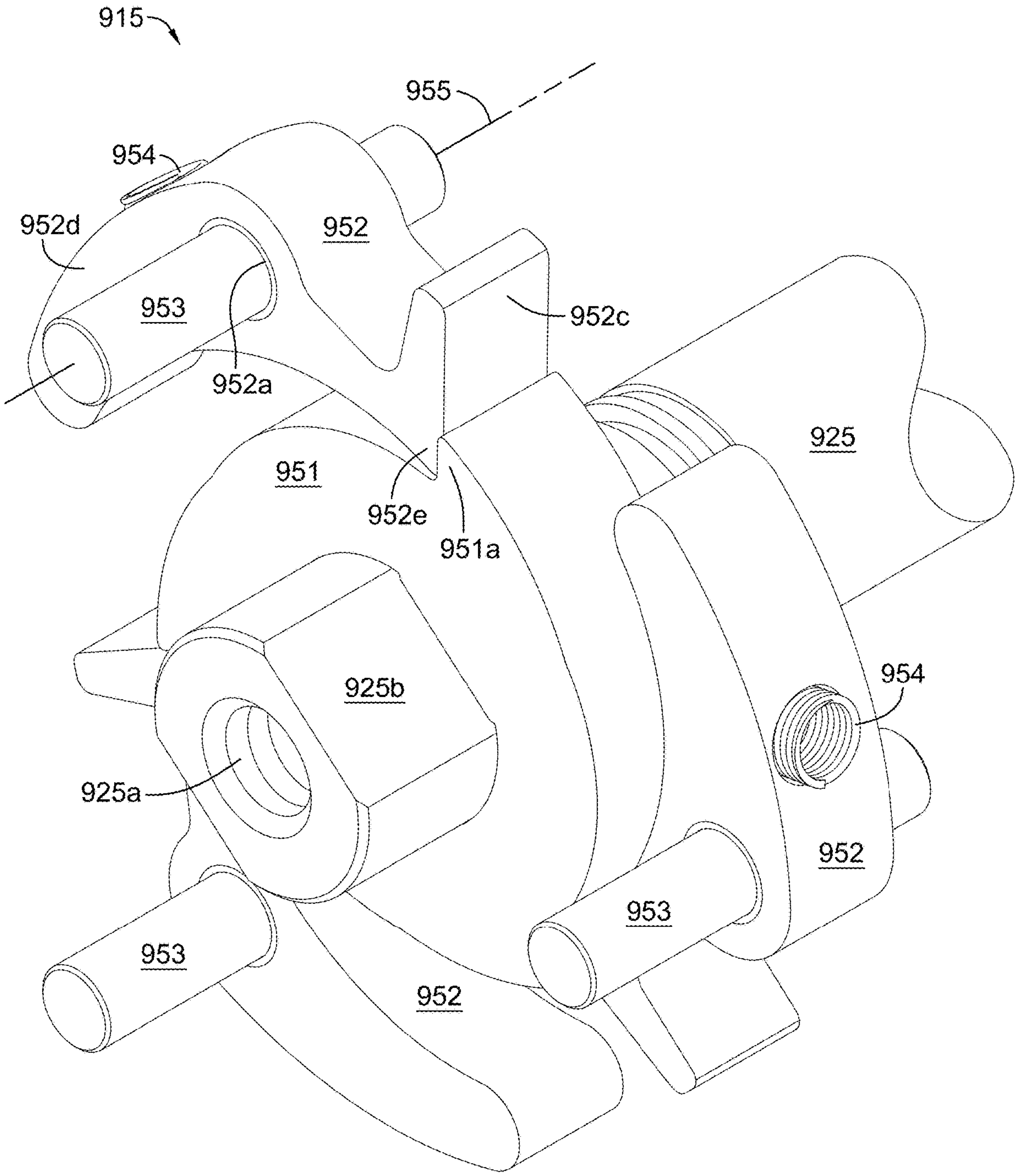
FIG. 22 is a perspective view of the upper side of the ratchet and pawls clutch mechanism of the pulley assembly of the electric deck motor assembly of FIG. 17, depicted in an engaged state.
Figure 23:
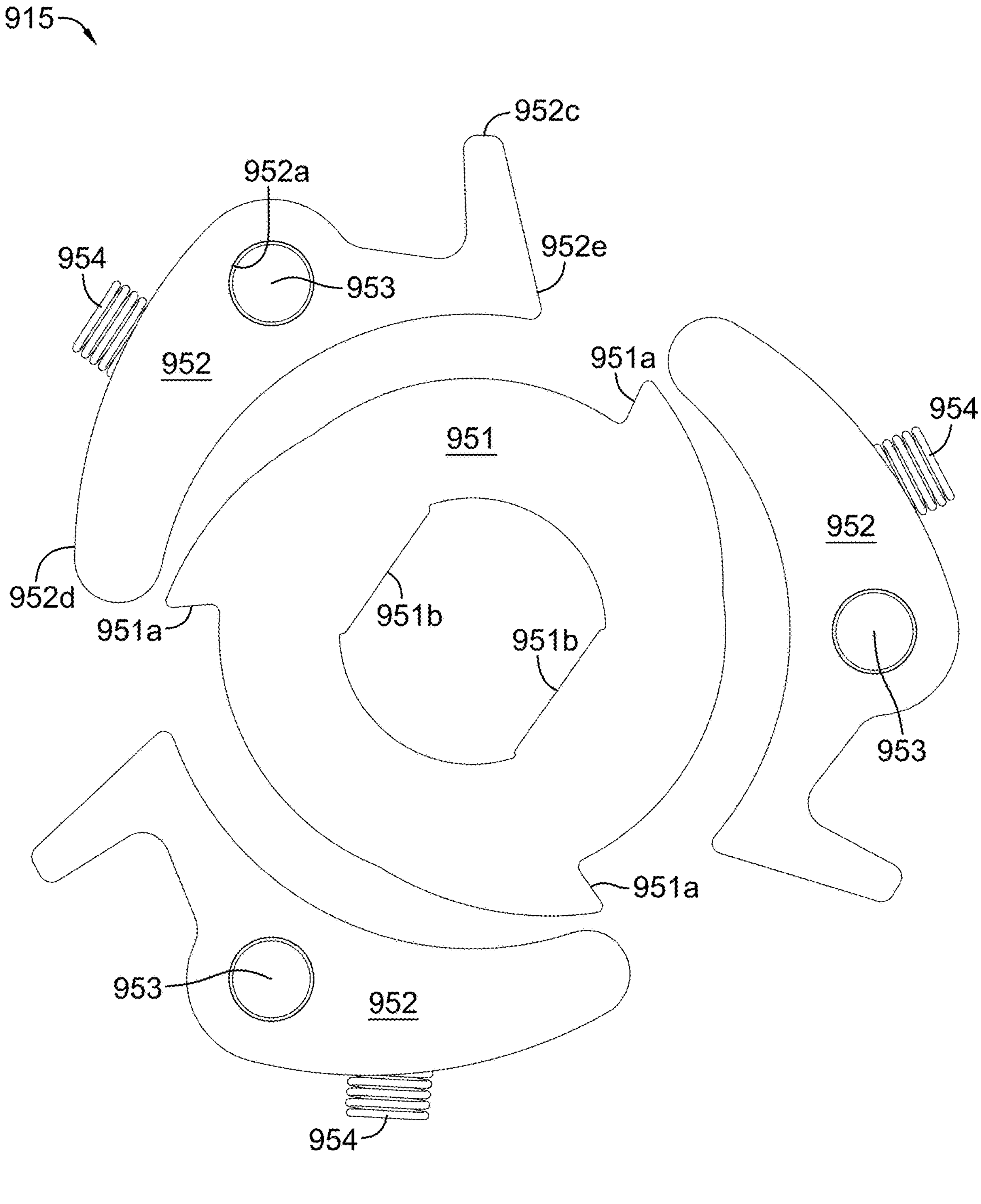
FIG. 23 is a plan view of the upper side of the ratchet and pawls clutch mechanism of the pulley assembly of the electric deck motor assembly of FIG. 17, depicted in a disengaged state.

As shown in FIGS. 18-20, Each pawl 952 is pivotably mounted on a pivot pin 953 installed in hub housing 931 so the pawls 952 rotate with hub housing 931 (and thereby with pulley 913). Pawls 952 are disposed in an internal cylindrical groove 931*b* formed in hub housing 931. As assembled, each pivot pin 953 extends through an upper hole 931*c* formed in hub housing 931, through a pivot pin hole 952*a* formed in each pawl 952 and into a lower bore 931*d* formed in hub housing 931. Each pawl 952 is biased to a disengaged position by a spring 954 installed in a bore 952*b* formed in pawl 952. A travel limit arm 952*c* of each pawl 952 extends in a first direction from pivot pin hole 952*a*/pivot pin 953/pawl pivot axis 955 and bears against the cylindrical surface of the cylindrical groove 931*b* when clutch mechanism 915 is in a clutch-disengaged mode. Each travel limit arm 952*c* comprises a pawl catch 952*e* that contacts/engages a ratchet tooth 951*a* as clutch mechanism 915 enters a clutch-engaged mode. A counterweight arm 952*d* extends arcuately in a substantially opposite second direction from pivot pin hole 952*a*/pivot pin 953/pawl pivot axis 955.

When vehicle 190 is operating solely under electric power, IC engine 191 is off and the one-way clutch mechanism 915 is disengaged. Clutch mechanism 915 engagement occurs when IC engine 191 runs and drives the pulley(s) 913 (along with hub housing 931 and pawls 952) at a rotational speed that causes each counterweight arm 952*d* of each pawl 952 to pivot outward while each pawl catch 952*e* of each pawl 952 pivots inward to contact/engage a ratchet tooth 951.

The rotational speed of the pawl carrier, the location of the pawl center of mass relative to its pivot axis and the spring force of the biasing spring affect the pivoting motion of the pawls. The engineered location or "setting" of the center of mass of the pawl, along with the spring rate and spring preload of the biasing spring, determines the pawl carrier rotational speed at which the pawls engage and disengage. The location of the pawl center of mass relative to the pawl pivot axis determines whether the pawl is engaged above or below a target rotational speed of the pawl carrier.

The ratchet 951 of one-way clutch mechanism 915 is joined to and rotates with the motor output shaft 925 at a first rotational speed. The pulley 913, along with pulley hub assembly 929 comprising pawl carrier (hub housing) 931 and pawls 952, rotates at a predetermined second rotational speed, causing the pawls 952 to contact the ratchet 951. (That is, IC engine 191 starts and catches up with the speed of deck motor(s) 910.) If the pawls 952 are contacting the ratchet 951 and the second rotational speed matches the first rotational speed, the motor output shaft 925 is then driven by the combustion power source (e.g., internal combustion engine 191).

The amount of pawl ratcheting depends on the clutch engagement speed relative to the usual deck motor speed. If the two speeds are close there will be only a small amount of ratcheting while the engine cycles on and off.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hybrid drive system for a utility vehicle comprising:
- an electrical power source;
- an electric motor having an output shaft and a connector configured to alternatively receive power from or convey power to the electrical power source;
- an electric motor compartment containing the electric motor and comprising:
  - a motor end cap positioned beneath a pulley relative to a mounting deck to which the motor end cap is mounted;
  - a motor stator housing positioned beneath the motor end cap and extending through a receiving hole in the mounting deck; and
- a clutch bearing comprising:
  - an inner race that is joined to and rotates with a proximal end of the output shaft; and
  - an outer race that is joined to and rotates with the pulley; and
- an internal combustion engine that connects to and selectively drives rotation of the pulley;
- wherein:
  - the electrical power source provides power to the electric motor sufficient to cause the output shaft and inner race to rotate at a first rotational speed;
  - the internal combustion engine selectively drives rotation of the pulley and outer race at a second rotational speed; and
  - when the second rotational speed reaches the first rotational speed, the clutch bearing engages such that the first inner race is driven by the outer race.

2. The hybrid drive system of claim 1, further comprising a pulley hub fixedly mounted to the pulley, and wherein the clutch bearing is retained within the pulley hub.

3. The hybrid drive system of claim 1 wherein, when the clutch bearing is engaged and belt power applied to the pulley exceeds a load applied to the output shaft, the connector conveys power from the electric motor to the electrical power source.

4. The hybrid drive system of claim 1, wherein the inner race is connected to the output shaft by a threaded fastener that passes through a central hole in the pulley and into a threaded bore of the output shaft.

5. The hybrid drive system of claim 1, wherein the inner race is connected to the output shaft by a threaded fastener, and wherein the pulley covers over and conceals a top of the threaded fastener.

6. The hybrid drive system of claim 1, further comprising at least one deck spindle driven by a belt connected to the output shaft of the electric motor such that the at least one deck spindle rotates with the output shaft.

7. The hybrid drive system of claim 1, wherein the motor end cap comprises a plurality of threaded mounting holes for receiving fasteners through a plurality of mounting holes positioned around the receiving hole.

8. The hybrid drive system of claim 1, wherein the motor end cap comprises an electrical compartment configured to receive the connector.

9. A hybrid drive system for a utility vehicle comprising:
- an electrical power source;
- an electric motor having an output shaft and a connector configured to alternatively receive power from or convey power to the electrical power source;
- a clutch mechanism having a ratchet that is joined to and rotates with the output shaft at a first rotational speed and at least one pawl that is joined to and rotates with a pulley at a second rotational speed; and
- an internal combustion engine that connects to and selectively drives rotation of the pulley;
- wherein, when the pulley rotates at a predetermined second rotational speed, the at least one pawl pivots about a pivot pin causing the at least one pawl to contact the ratchet; and
- wherein, if the at least one pawl is contacting the ratchet and the second rotational speed matches the first rotational speed, the output shaft is then driven by the internal combustion engine.

10. The hybrid drive system of claim 1, wherein the electric motor compartment further comprises a motor output cap through which a distal end of the output shaft extends.

11. The hybrid drive system of claim 3, further comprising an electric motor controller that directs the power from the electric motor to the electrical power source when the electric motor controller determines the clutch bearing is engaged and belt power applied to the pulley exceeds the load applied to the output shaft.

12. The hybrid drive system of claim 9 wherein, when the output shaft is driven by the internal combustion engine, the connector conveys power to the electrical power source.

13. The hybrid drive system of claim 9 wherein, when the at least one pawl contacts the ratchet, the clutch mechanism is in an engaged state such that the first rotational speed equals the second rotational speed.

14. The hybrid drive system of claim 9, further comprising at least one spring configured to bias the at least one pawl toward a disengaged position at which the at least one pawl does not contact the ratchet.

15. A hybrid drive system for a utility vehicle comprising:
- an electrical power source;
- an electric motor comprising an output shaft;
- a connector configured to alternatively convey power to the electric motor from the electric power source or convey power from the electric motor to the electrical power source;
- a housing containing the electric motor, the housing positioned below a pulley and mounted to a mounting deck having a receiving hole through which the output shaft extends, the housing comprising:
  - a motor end cap mounted to the mounting deck; and
  - a motor stator housing that extends through the receiving hole;
- a clutch bearing comprising:
  - an inner race that is joined to and rotates with the output shaft; and
  - an outer race that is joined to and rotates with the pulley; and
- an internal combustion engine that connects to the pulley via a belt.

16. The hybrid drive system of claim 15, wherein, when the inner race and the outer race rotate at the same speed, the connector conveys power from the electric motor to the electric power source.

* * * * *